US010374793B2

(12) United States Patent
Kaul et al.

(10) Patent No.: US 10,374,793 B2
(45) Date of Patent: Aug. 6, 2019

(54) SIMON-BASED HASHING FOR FUSE VALIDATION

(71) Applicant: Intel Corporation, Santa Clara, CA (US)

(72) Inventors: Himanshu Kaul, Portland, OR (US);
Sanu Mathew, Hillsboro, OR (US);
Mark Anders, Hillsboro, OR (US);
Jesse Walker, Hillsboro, OR (US);
Jason Sandri, Gilbert, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 95 days.

(21) Appl. No.: 15/374,700

(22) Filed: Dec. 9, 2016

(65) Prior Publication Data

US 2018/0167199 A1 Jun. 14, 2018

(51) Int. Cl.
*H04L 9/06* (2006.01)
*G06F 12/14* (2006.01)
*G06F 17/50* (2006.01)

(52) U.S. Cl.
CPC ............ *H04L 9/0643* (2013.01); *G06F 12/14* (2013.01); *G06F 12/1408* (2013.01); *G06F 17/50* (2013.01); *H04L 9/06* (2013.01); *H04L 9/0618* (2013.01); *G06F 2212/1052* (2013.01)

(58) Field of Classification Search
CPC . H04L 9/0643; H04L 9/0618; G06F 12/1408; G06F 2212/1052
See application file for complete search history.

(56) References Cited

U.S. PATENT DOCUMENTS

| 7,277,950 | B1* | 10/2007 | Chapweske | H04L 67/104 709/203 |
| 7,664,902 | B1* | 2/2010 | Chow | G06F 12/1416 710/301 |
| 8,037,518 | B2* | 10/2011 | Buer | G06F 17/30949 370/389 |
| 9,853,810 | B1* | 12/2017 | Gomes | H04L 9/0643 |
| 2009/0313475 | A1* | 12/2009 | Roscoe | H04L 9/0643 713/181 |
| 2015/0280909 | A1* | 10/2015 | Mathew | G09C 1/00 380/278 |

OTHER PUBLICATIONS

Beaulieu, Ray and, Douglas Shors, Jason Smith, Stefan Treatman-Clark, Bryan Weeks, Louis Wingers, "The SIMON and SPECK lightweight block ciphers", Jun. 7-11, 2015, ACM (Year: 2015).*
Beaulieu, Ray, et al., "The Simon and Speck Families of Lightweight Block Ciphers," National Security Agency, Jun. 19, 2013, 45 pgs.

* cited by examiner

Primary Examiner — Thanhnga B Truong
Assistant Examiner — Wayne An
(74) Attorney, Agent, or Firm — Womble Bond Dickinson (US) LLP

(57) ABSTRACT

An instruction and logic for a Simon-based hashing for validation are described. In one embodiment, a processor comprises: a memory the memory to store a plurality of values; and a hash circuit comprising a Simon cipher circuit operable to receive the plurality of values from the memory, to apply a Simon cipher, and to generate an output for each of the plurality of values; and circuitry coupled to the Simon cipher circuit to combine outputs from the Simon cipher circuit for each value of the plurality of values into a hash digest that is indicative of whether the values in the memory are valid.

19 Claims, 28 Drawing Sheets

FIGURE 3A(1)

Packed Byte 310: bits 127-120 BYTE 15, 120-119... BYTE 14, 112-111 BYTE 13, 104-103 BYTE 12, ... 32-31 BYTE 3, 24-23 BYTE 2, 16-15 BYTE 1, 8-7 BYTE 0.

FIGURE 3A(2)

Packed Word 320: bits 127-112 WORD 7, 112-111 ... 96-95 WORD 6, ... 32-31 WORD 1, 16-15 WORD 0.

FIGURE 3A(3)

Packed Doubleword 330: bits 127-96 DOUBLEWORD 3, ... 32-31 ... DOUBLEWORD 0.

FIGURE 3B(1)

Packed Half — 341

| 127 | 112 111 | 96 95 | 80 79 | 64 63 | 48 47 | 32 31 | 16 15 | 0 |
|---|---|---|---|---|---|---|---|---|
| HALF 7 | HALF 6 | HALF 5 | HALF 4 | HALF 3 | HALF 2 | HALF 1 | HALF 0 | |

FIGURE 3B(2)

Packed Single — 342

| 127 | 96 95 | 64 63 | 32 31 | 0 |
|---|---|---|---|---|
| SINGLE 3 | SINGLE 2 | SINGLE 1 | SINGLE 0 | |

FIGURE 3B(3)

Packed Double — 343

| 127 | 64 63 | 0 |
|---|---|---|
| DOUBLE 1 | DOUBLE 0 | |

```
127    120 119   112 111   104 103              24 23    16 15     8 7      0
| bbbb bbbb | bbbb bbbb | bbbb bbbb |  •   •   •  | bbbb bbbb | bbbb bbbb | bbbb bbbb |
```

UNSIGNED PACKED BYTE REPRESENTATION 344

FIGURE 3C(1)

```
127    120 119   112 111   104 103              24 23    16 15     8 7      0
| sbbb bbbb | sbbb bbbb | sbbb bbbb |  •   •   •  | sbbb bbbb | sbbb bbbb | sbbb bbbb |
```

SIGNED PACKED BYTE REPRESENTATION 345

FIGURE 3C(2)

```
127              112 111                                  16 15              0
| wwww wwww wwww wwww |          •    •    •          | wwww wwww wwww wwww |
```

UNSIGNED PACKED WORD REPRESENTATION 346

FIGURE 3C(3)

```
127              112 111                                  16 15              0
| swww wwww wwww wwww |          •    •    •          | swww wwww wwww wwww |
```

SIGNED PACKED WORD REPRESENTATION 347

FIGURE 3C(4)

```
127                              92 91   32 31                              0
| dddd dddd dddd dddd dddd dddd dddd dddd |  • • •  | dddd dddd dddd dddd dddd dddd dddd dddd |
```

UNSIGNED PACKED DOUBLEWORD REPRESENTATION 348

FIGURE 3C(5)

```
127                              92 91   32 31                              0
| sddd dddd dddd dddd dddd dddd dddd dddd |  • • •  | sddd dddd dddd dddd dddd dddd dddd dddd |
```

SIGNED PACKED DOUBLEWORD REPRESENTATION 349

FIGURE 3C(6)

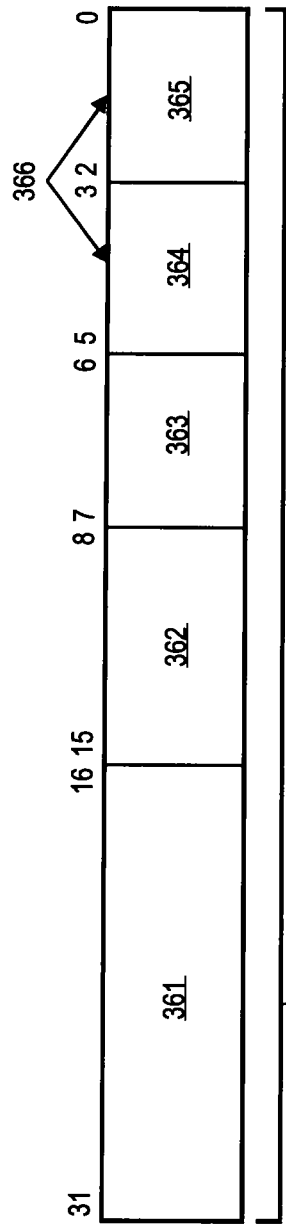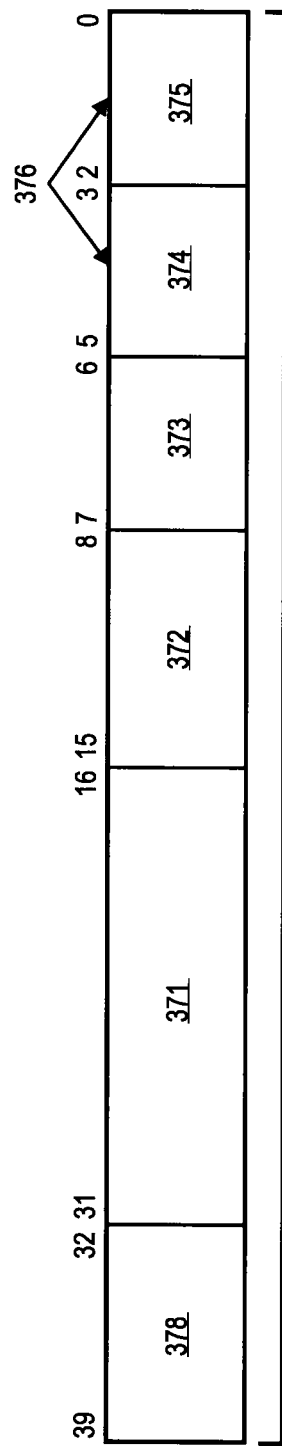

SIMON-BASED HASHING FOR FUSE VALIDATION

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Integrated circuits have grown quite complex over the past few. Many of these devices are configured with the use of fuse values stored in a fuse array. The fuse values may be used to enable or disable functionality on the device or may include information that is used on the device, such as, for example, encryption keys. The fuse values are initially programmed into the fuse array. After programming, the programmed fuse values under validation to make sure they are programmed correctly. Validation of secret fuse values during high volume manufacturing (HVM) testing requires the ability to read fuses without compromising their confidentiality. For example, encryption keys that have been burnt into fuses need to be validated during HVM, without explicitly exposing the stored keys. A conventional solution to this problem would be to compute a hash of the fuse bits using on-die circuits, and read this hash value out of the chip for fuse validation. Since the hashes are one-way functions, they allow fuse validation without exposing the original fuse value. However, conventional hashing circuits such as SHA-256 occupy considerable die area that cannot be justified for a one-time-use circuit that is operational only at test time or during debugging of customer-returned failed parts.

DESCRIPTION OF THE FIGURES

Embodiments are illustrated by way of example and not limitation in the Figures of the accompanying drawings:

FIG. 3A(1)-(3) illustrates packed data types according to one embodiment;

FIG. 3B(1)-(3) illustrates packed data types according one embodiment;

FIG. 3C(1)-(6) illustrates packed data types according to one embodiment;

FIG. 3D illustrates an instruction encoding according to one embodiment;

FIG. 3E illustrates an instruction encoding according to one embodiment;

DETAILED DESCRIPTION

Figure 1A:
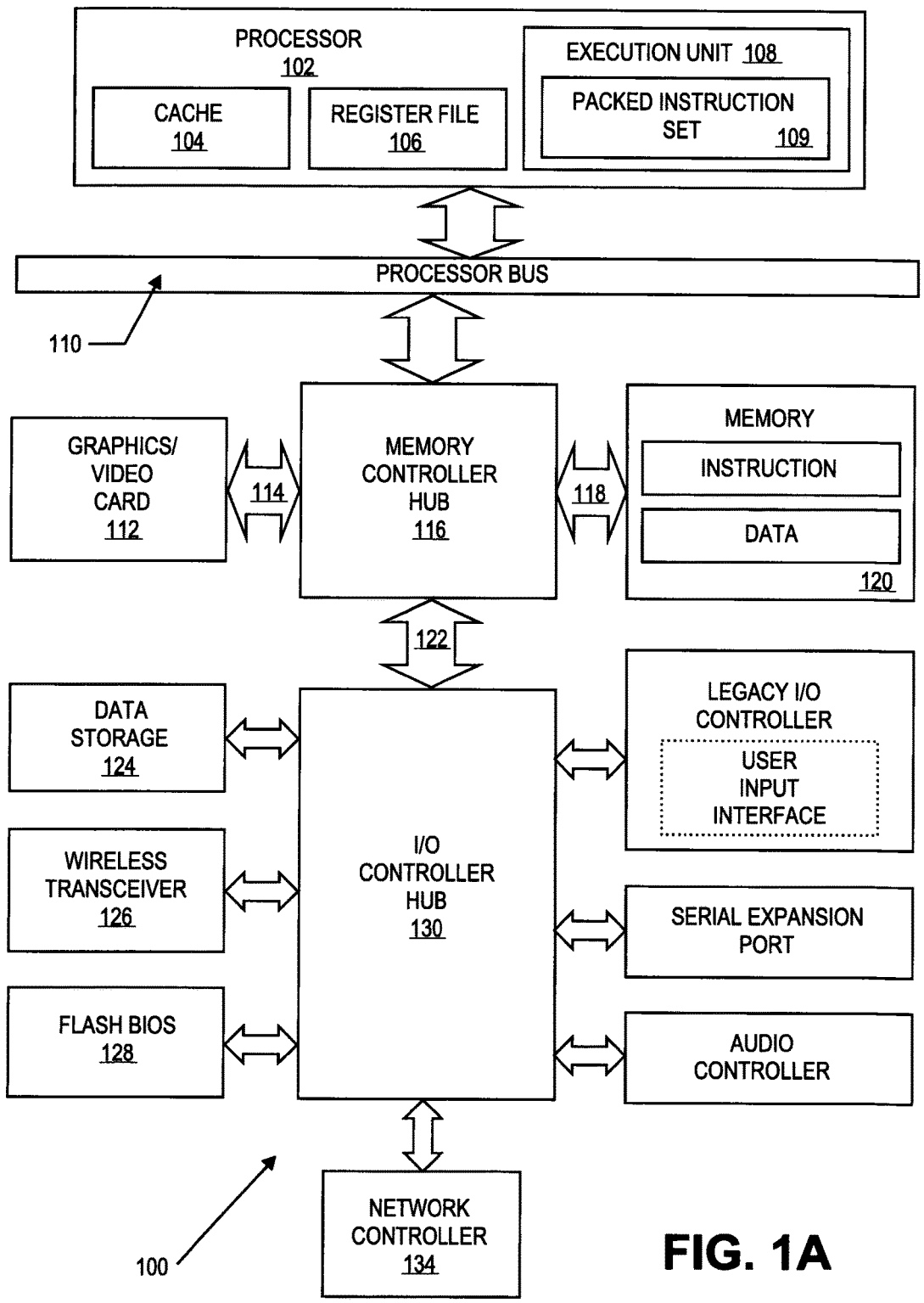
FIG. 1A is a block diagram of a system according to one embodiment.

A fuse validation micro-architecture and method for using the same are disclosed. The following description describes processing logic to perform fuse validation on fuses in a fuse array without revealing those fuse values that had been programmed into the fuse array. The processing logic is within or in association with a processor or other integrated circuit, computer system, or other processing apparatus. In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeontm, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102.

The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
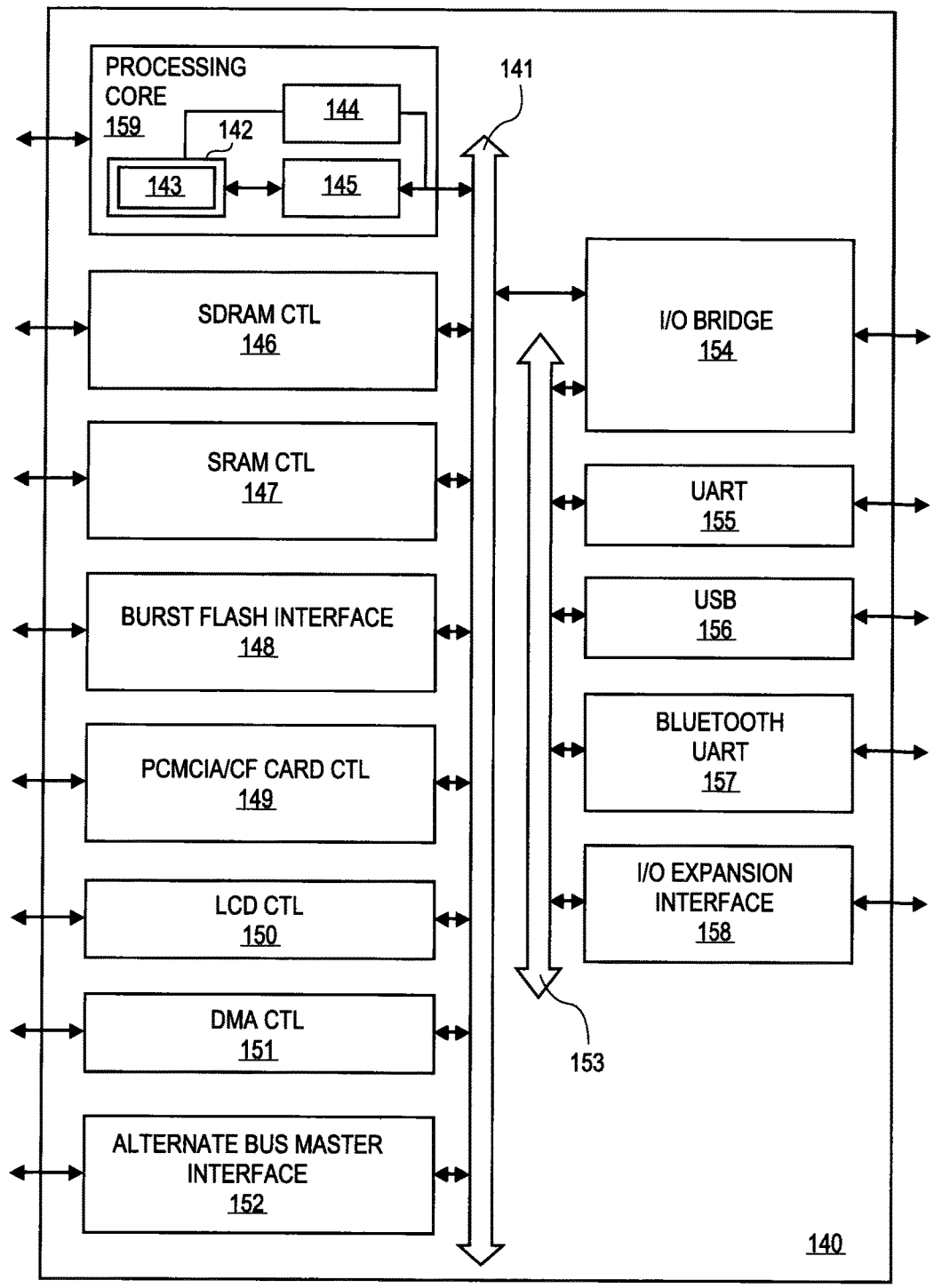
FIG. 1B is a block diagram of a system according to one embodiment.

FIG. 1B illustrates a data processing system 140 which implements the principles of one embodiment of the present invention. It will be readily appreciated by one of skill in the art that the embodiments described herein can be used with alternative processing systems without departure from the scope of embodiments of the invention.

Computer system 140 comprises a processing core 159 capable of performing at least one instruction in accordance with one embodiment. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present invention. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
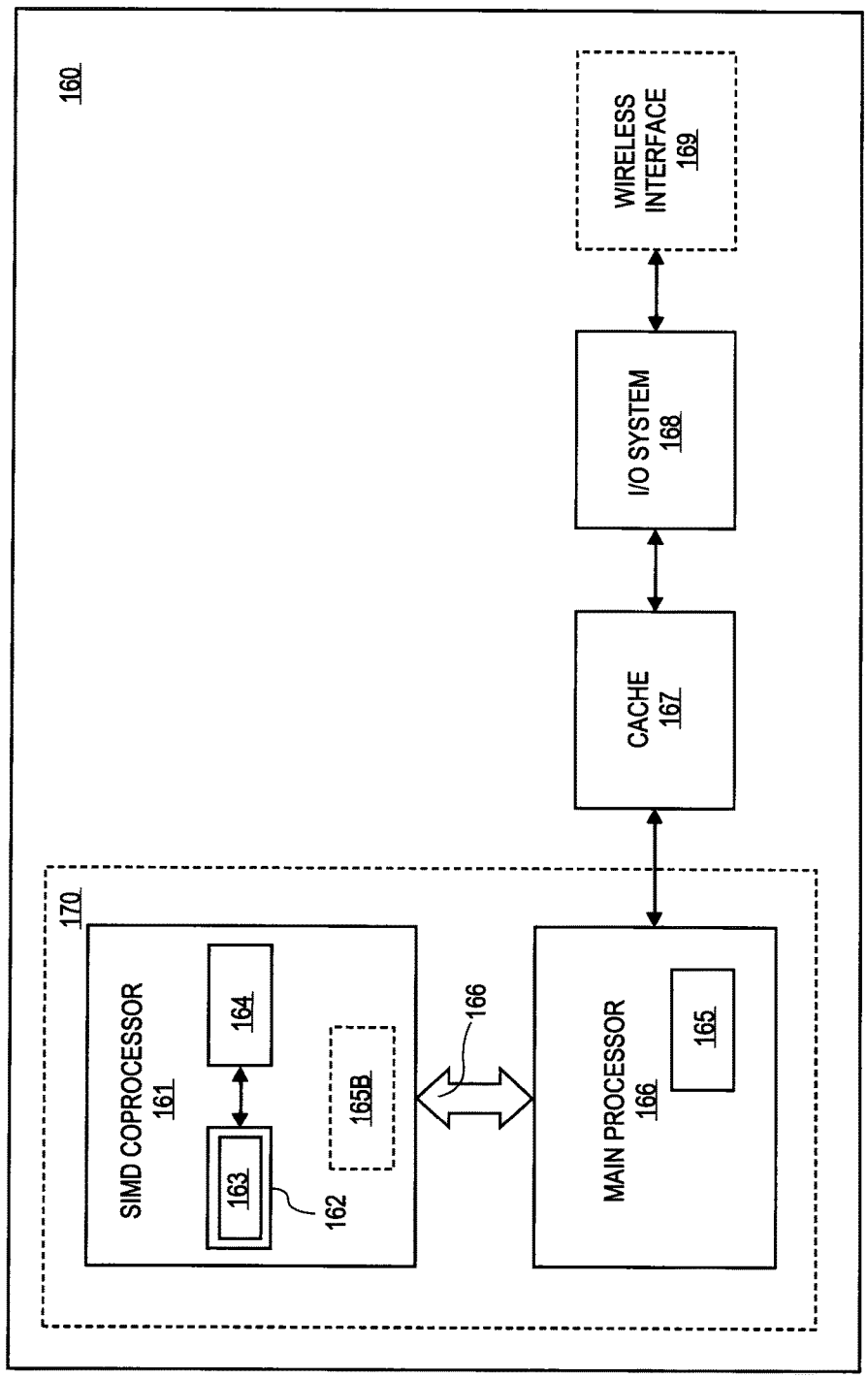
FIG. 1C is a block diagram of a system according to one embodiment.

FIG. 1C illustrates yet alternative embodiments of a data processing system capable of performing SIMD text string comparison operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing operations including instructions in accordance with one embodiment. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including instructions in accordance with one embodiment for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of embodiments of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 166 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including instructions in accordance with one embodiment.

Figure 2:
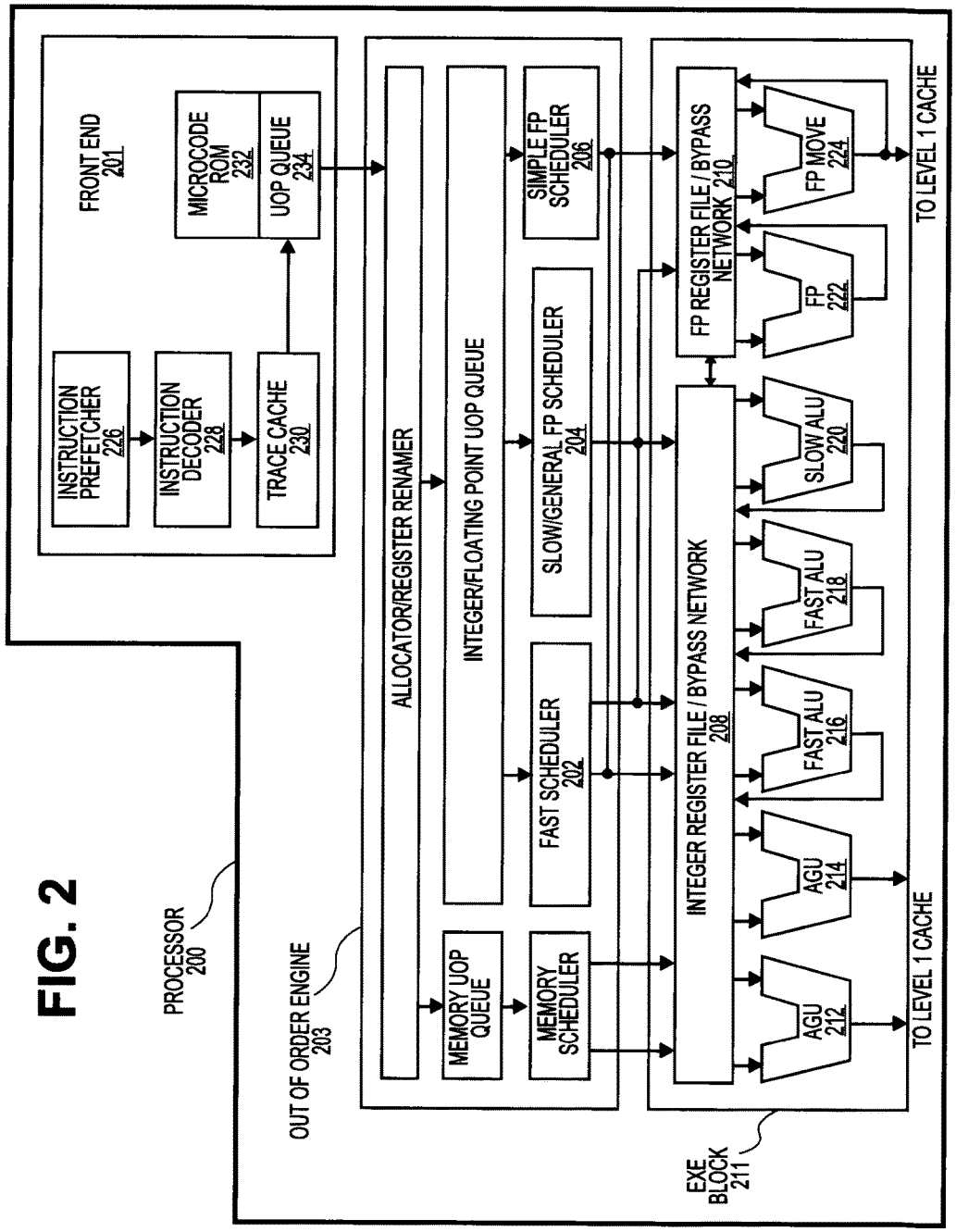
FIG. 2 is a block diagram of a processor according to one embodiment.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

In the examples of the following figures, a number of data operands are described. FIG. 3A(1)-(3) illustrate various packed data type representations in multimedia registers according to one embodiment of the present invention. FIG. 3A(1)-(3) illustrates data types for a packed byte 310, a packed word 320, and a packed doubleword (dword) 330 for 128 bits wide operand, respectively. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A(1)-(3) are 128 bit long, embodiments of the present invention can also operate with 64 bit wide or other sized operands. The packed word format 320 of this example is 128 bits long and contains eight packed word data elements. Each packed word contains sixteen bits of information. The packed doubleword format 330 of FIG. 3A(3) is 128 bits long and contains four packed doubleword data elements. Each packed doubleword data element contains thirty two bits of information. A packed quadword is 128 bits long and contains two packed quad-word data elements.

FIG. 3B(1)-(3) illustrate alternative in-register data storage formats. Each packed data can include more than one independent data element. Three packed data formats are illustrated; packed half 341(FIG. 3b(1)), packed single 342 (FIG. 3b(2)), and packed double 343(FIG. 3b(3)). One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 3C(1)-(6) illustrate various signed and unsigned packed data type representations in multimedia registers according to one embodiment of the present invention. In FIG. 3c(1) unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen. Thus, all available bits are used in the register. This storage arrangement can increase the storage efficiency of the processor. As well, with sixteen data elements accessed, one operation can now be performed on sixteen data elements in a parallel fashion. In FIG. 3c(2), signed packed byte representation 345 illustrates the storage of a signed packed byte. Note that the eighth bit of every byte data element is the sign indicator. In FIG. 3c(3), unsigned packed word representation 346 illustrates how word seven through word zero are stored in a SIMD register. In FIG. 3c(4) signed packed word representation 347 is similar to the unsigned packed word in-register representation 346. Note that the sixteenth bit of each word data element is the sign indicator. In FIG. 3c(5) unsigned packed doubleword representation 348 shows how doubleword data elements are stored. In FIG. 3c(6) signed packed doubleword representation 349 is similar to unsigned packed doubleword in-register representation 348. Note that the necessary sign bit is the thirty-second bit of each doubleword data element.

FIG. 3D is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. For one embodiment, destination operand identifier 366 is the same as source operand identifier 364, whereas in other embodiments they are different. For an alternative embodiment, destination operand identifier 366 is the same as source operand identifier 365, whereas in other embodiments they are different. In one embodiment, one of the source operands identified by source operand identifiers 364 and 365 is overwritten by the results of the text string comparison operations, whereas in other embodiments identifier 364 corresponds to a source register element and identifier 365 corresponds to a destination register element. For one embodiment, operand identifiers 364 and 365 may be used to identify 32-bit or 64-bit source and destination operands.

FIG. 3E is a depiction of another alternative operation encoding (opcode) format 370, having forty or more bits. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. For one embodiment, prefix byte 378 may be used to identify 32-bit or 64-bit source and destination operands. For one embodiment, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, an instruction operates on one or more of the operands identified by operand identifiers 374 and 375 and one or more operands identified by the operand identifiers 374 and 375 is overwritten by the results of the instruction, whereas in other embodiments, operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
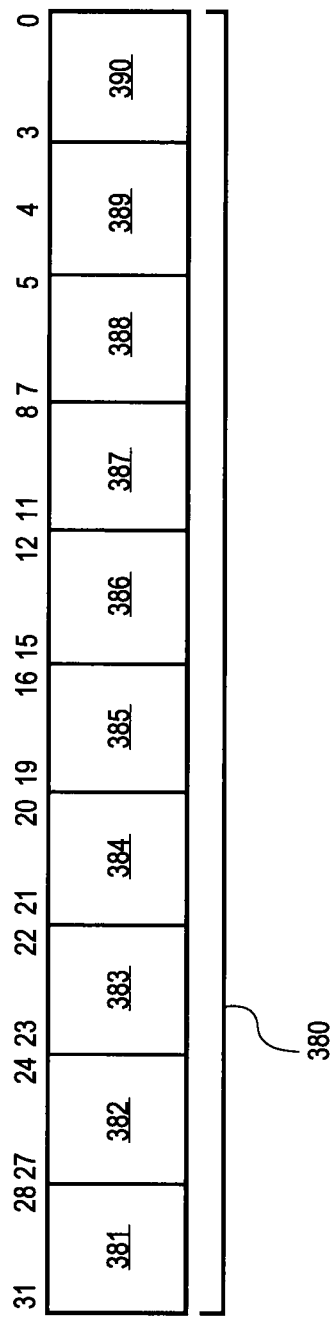
FIG. 3F illustrates an instruction encoding according to one embodiment.

Turning next to FIG. 3F, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments, operations may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, an instruction is performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection can be done on SIMD fields. For some instructions, the type of saturation may be encoded by field 384.

Figures 4A, 4B:
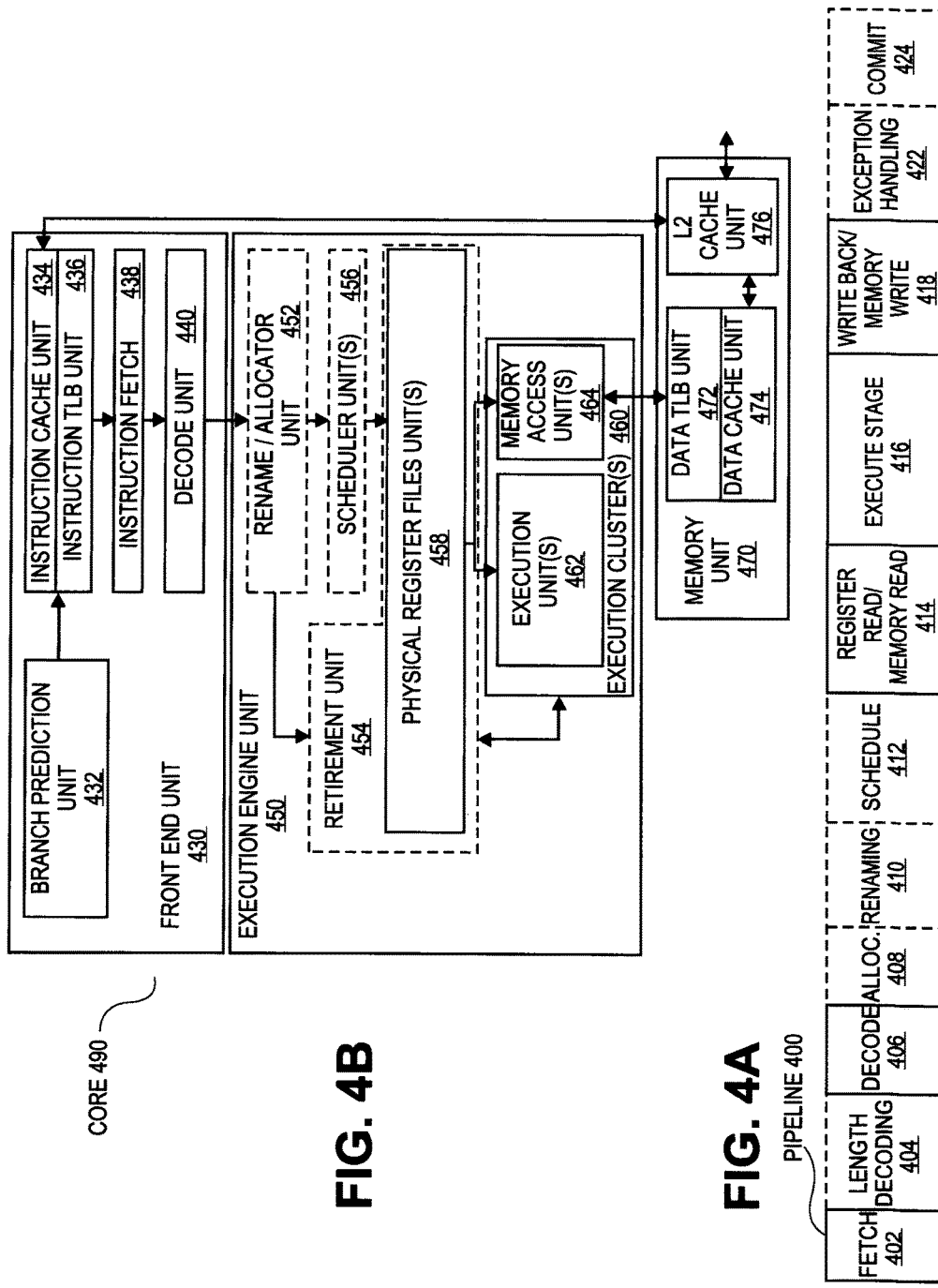
FIG. 4A illustrates elements of a processor micro-architecture according to one embodiment.
FIG. 4B illustrates elements of a processor micro-architecture according to one embodiment.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
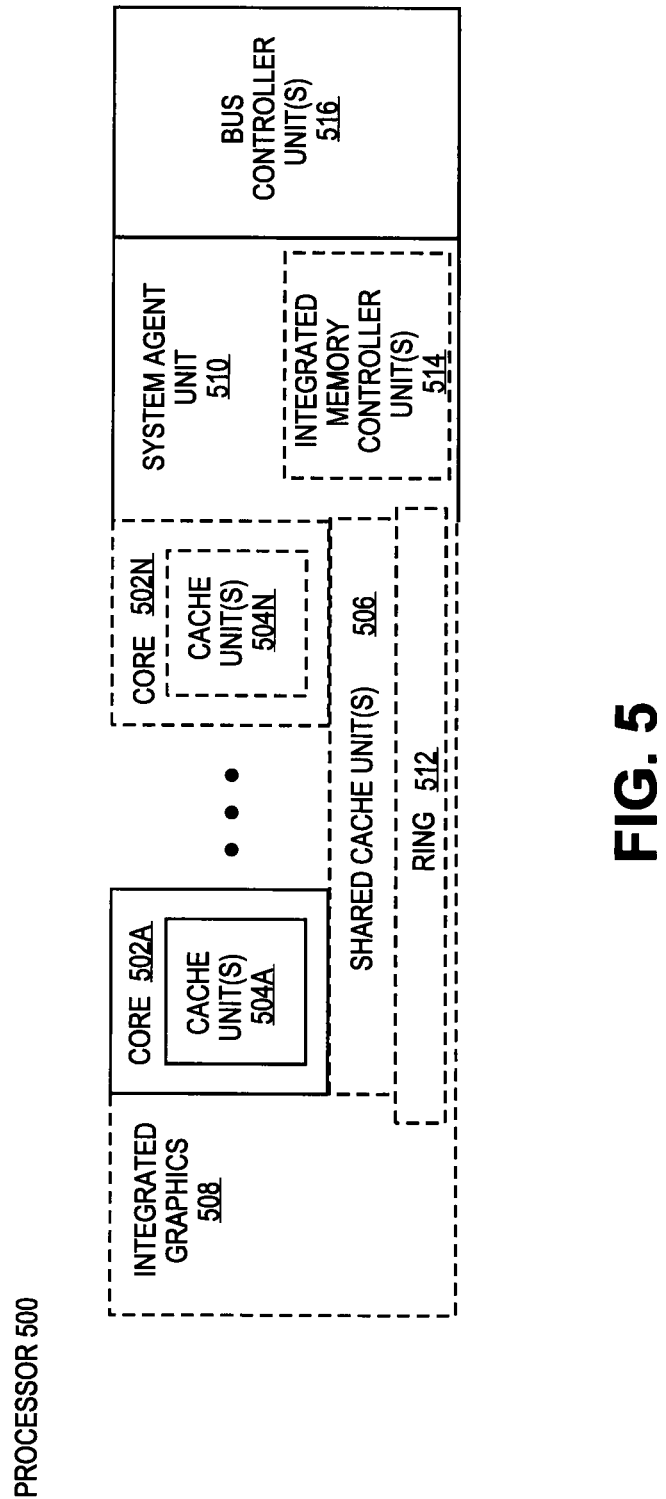
FIG. 5 is a block diagram of a processor according to one embodiment.

FIG. 5 is a block diagram of a single core processor and a multicore processor 500 with integrated memory controller and graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and an integrated graphics logic 508.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510, alternative embodiments may use any number of well-known techniques for interconnecting such units.

In some embodiments, one or more of the cores 502A-N are capable of multi-threading.

The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 500 may be a part of and/or may be implemented on one or more substrates using any of a number of process technologies, such as, for example, BiCMOS, CMOS, or NMOS.

Figure 6:
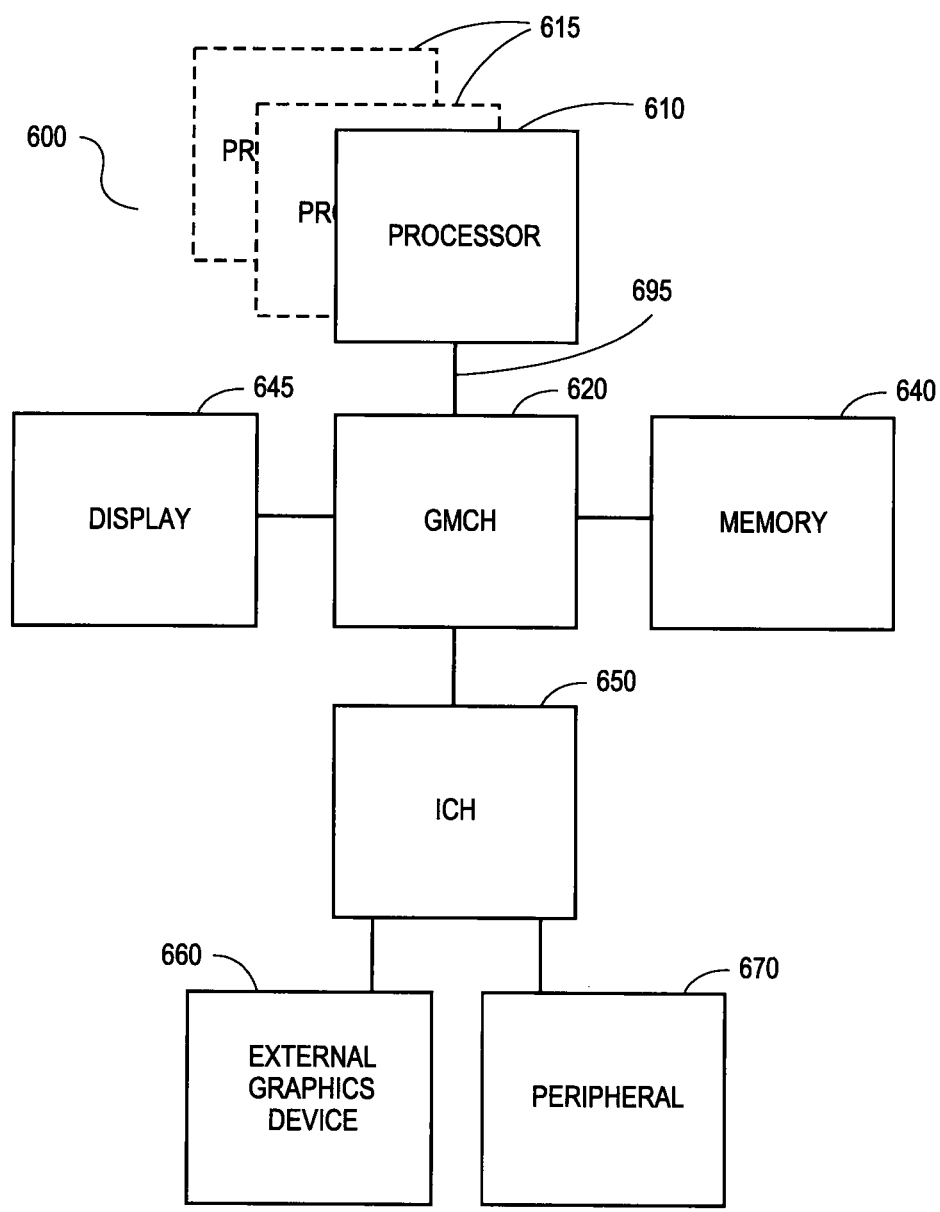
FIG. 6 is a block diagram of a computer system according to one embodiment.
Figure 7:
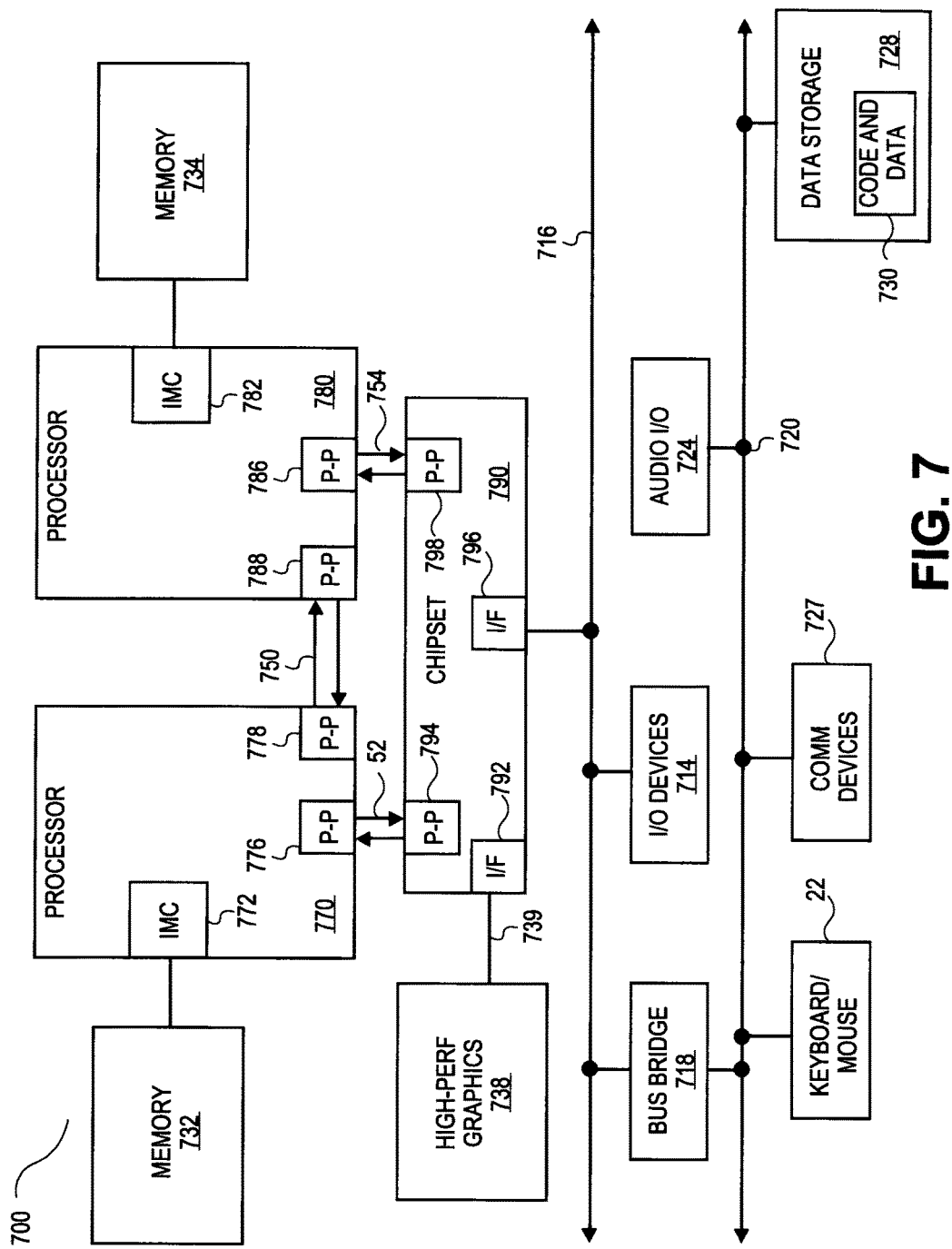
FIG. 7 is a block diagram of a computer system according to one embodiment.
Figure 8:
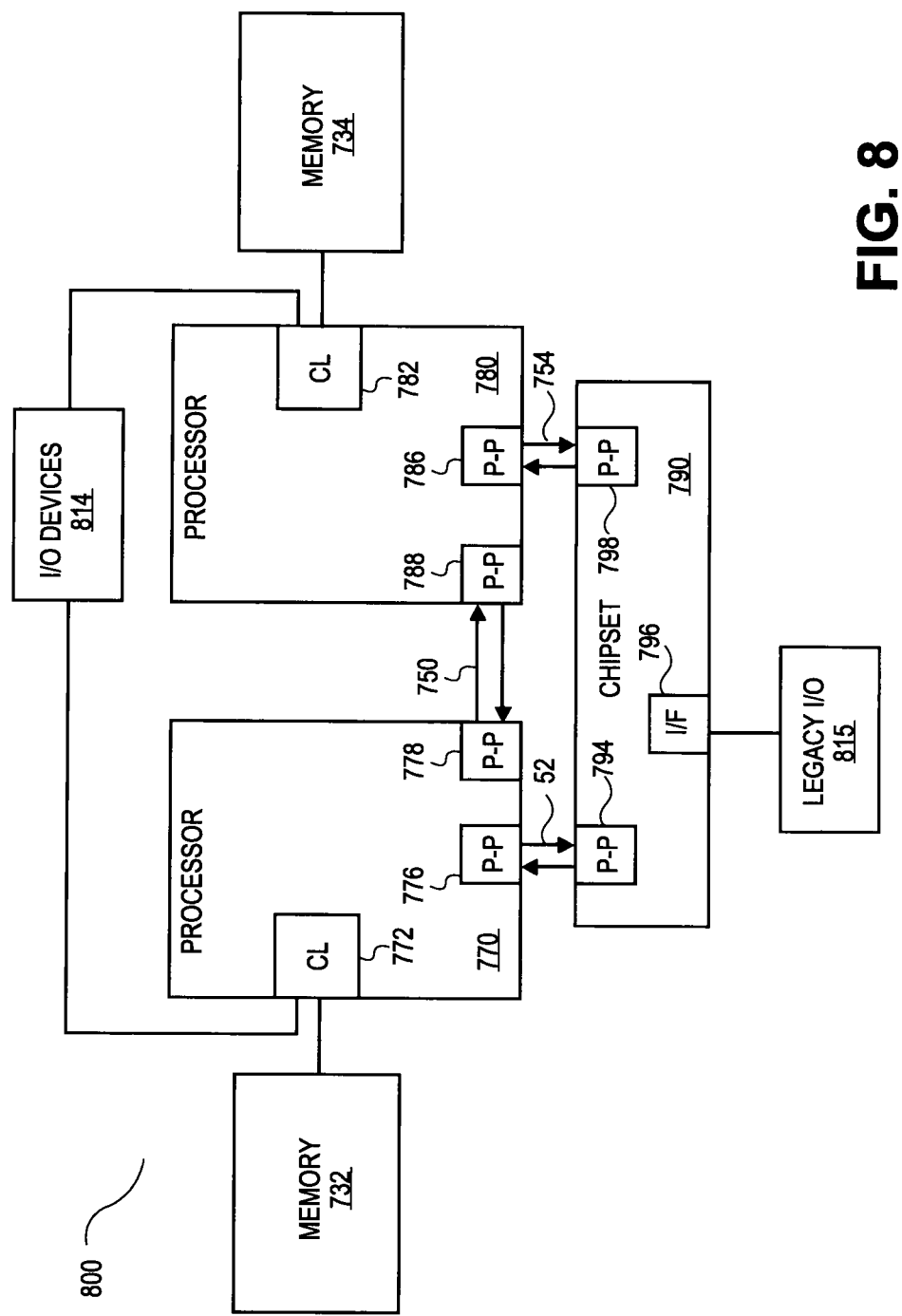
FIG. 8 is a block diagram of a computer system according to one embodiment.
Figure 9:
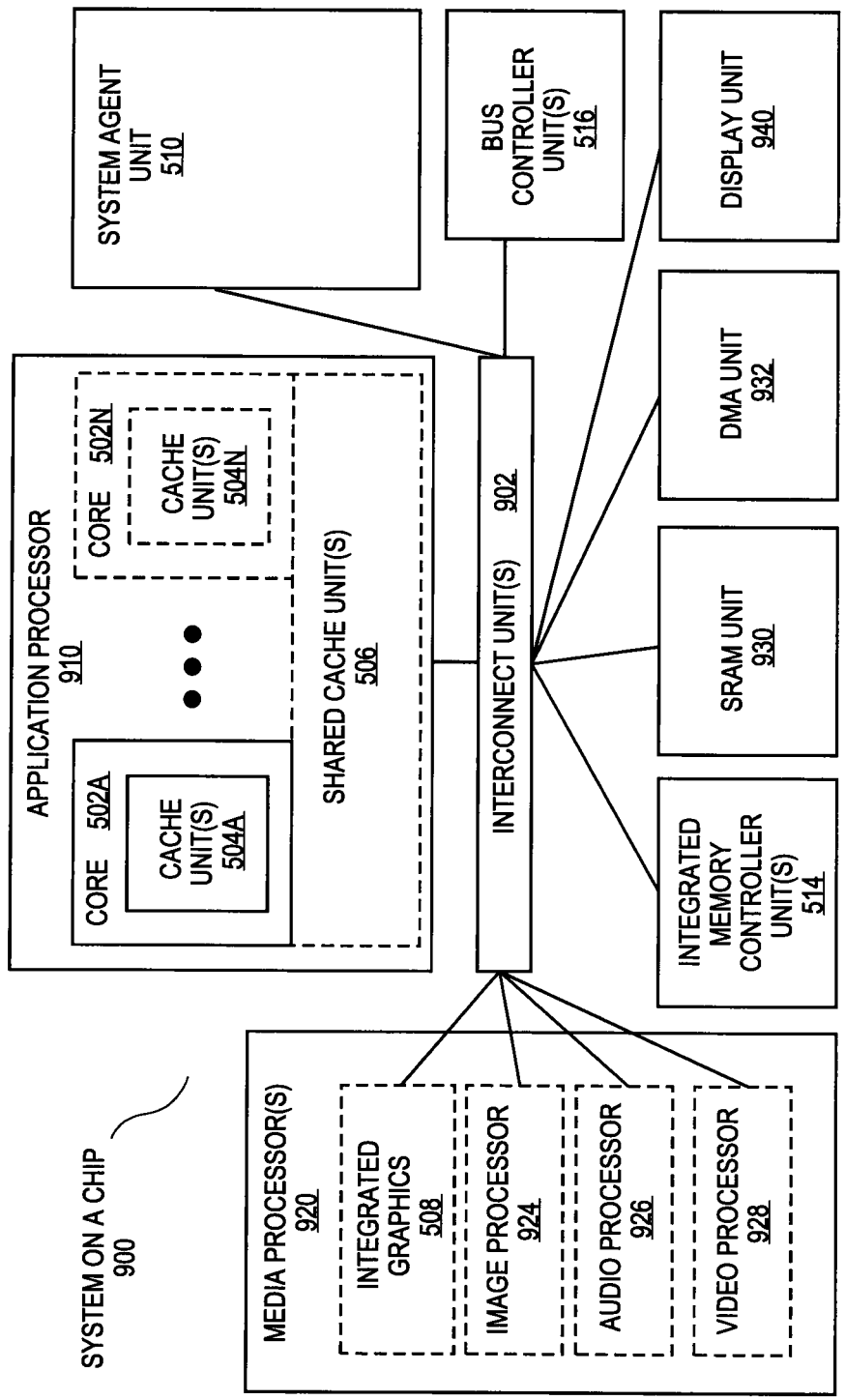
FIG. 9 is a block diagram of a system-on-a-chip according to one embodiment.

FIGS. 6-8 are exemplary systems suitable for including the processor 500, while FIG. 9 is an exemplary system on a chip (SoC) that may include one or more of the cores 502. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610,615 may be some version of the processor 500. However, it should be noted that it is unlikely that integrated graphics logic and integrated memory control units would exist in the processors 610,615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500 as one or more of the processors 610,615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Referring now to FIG. 8, shown is a block diagram of a third system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 870, 880 may include integrated memory and I/O control logic ("CL") 872 and 882, respectively. For at least one embodiment, the CL 872, 882 may include integrated memory controller units such as that described above in connection with FIGS. 5 and 7. In addition. CL 872, 882 may also include I/O control logic. FIG. 8 illustrates that not only are the memories 832, 834 coupled to the CL 872, 882, but also that I/O devices 814 are also coupled to the control logic 872, 882. Legacy I/O devices 815 are coupled to the chipset 890.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode accelera-tion; an static random access memory (SRAM) unit 930; a direct memory access (DMA) unit 932; and a display unit 940 for coupling to one or more external displays.

Figure 10:
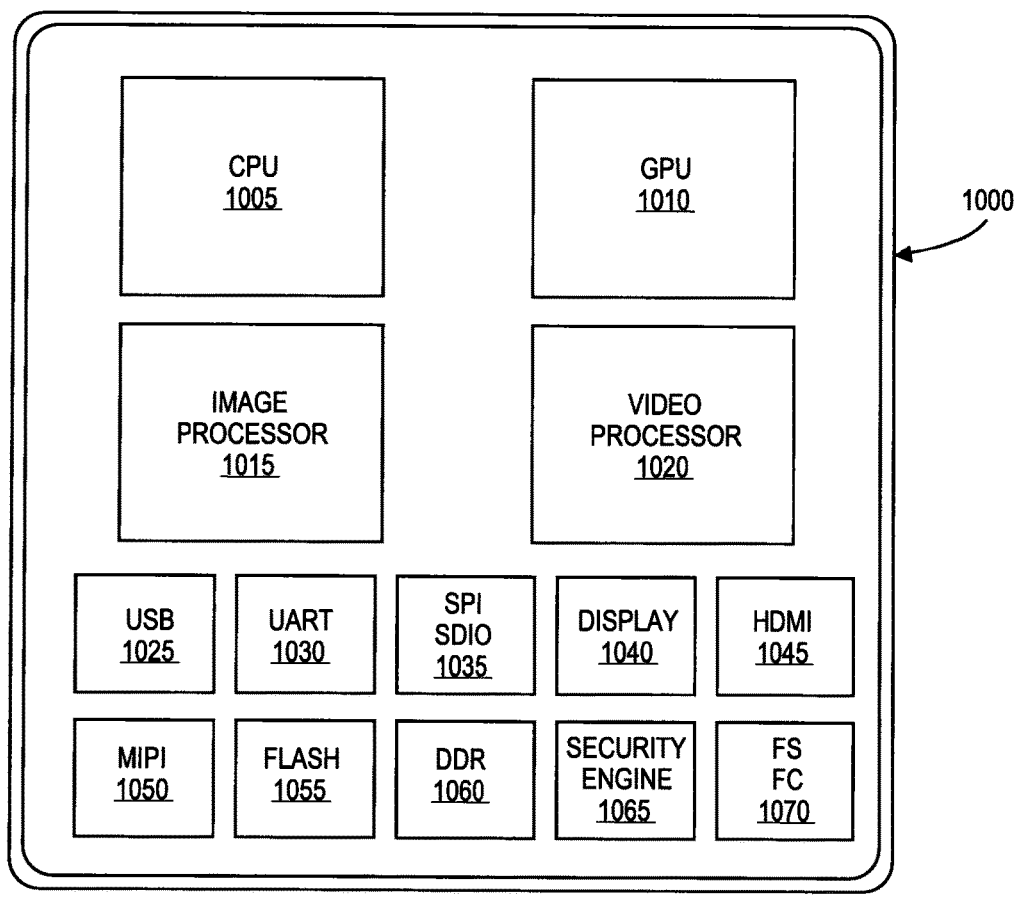
FIG. 10 is a block diagram of a processor according to one embodiment.

FIG. 10 illustrates a processor containing a central processing unit (CPU) and a graphics processing unit (GPU), which may perform at least one instruction according to one embodiment. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and I2S/I2C controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
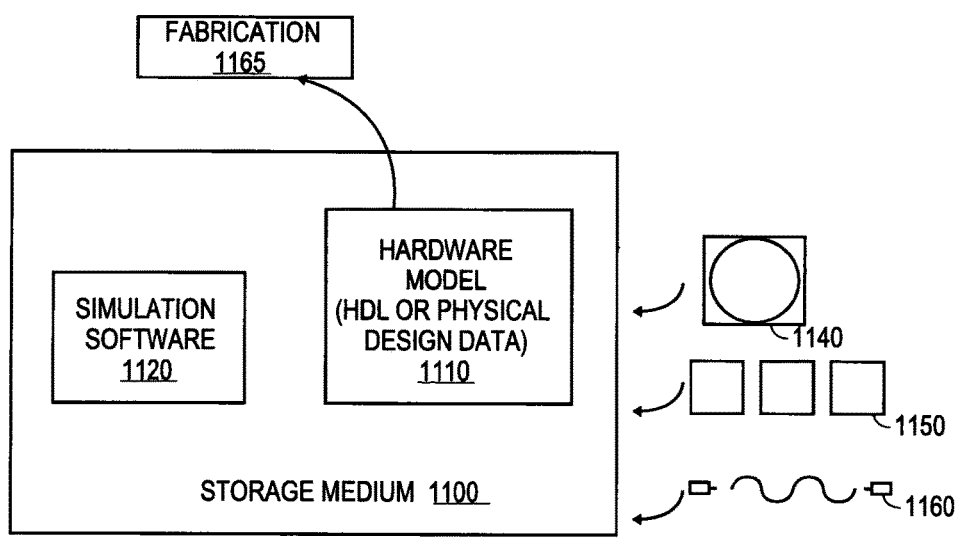
FIG. 11 is a block diagram of an IP core development system according to one embodiment.

FIG. 11 shows a block diagram illustrating the development of IP cores according to one embodiment. Storage 1130 includes simulation software 1120 and/or hardware or software model 1110. In one embodiment, the data representing the IP core design can be provided to the storage 1130 via memory 1140 (e.g., hard disk), wired connection (e.g., internet) 1150 or wireless connection 1160. The IP core information generated by the simulation tool and model can then be transmitted to a fabrication facility where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
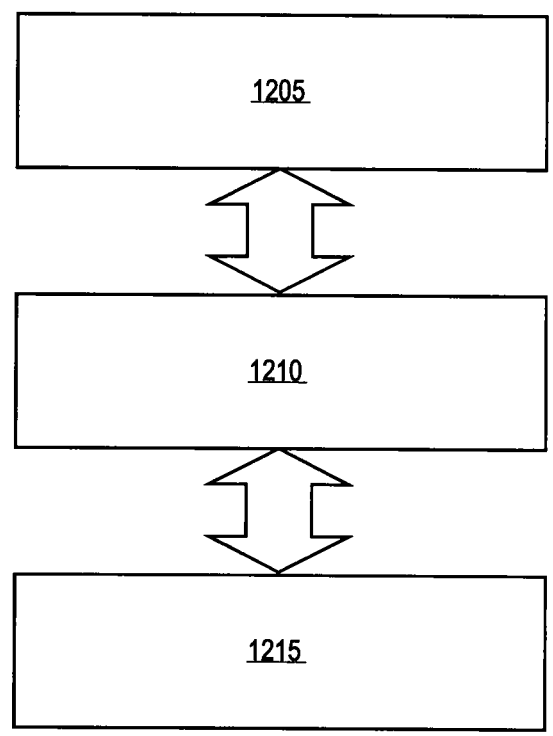
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to executed natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

Figure 13:
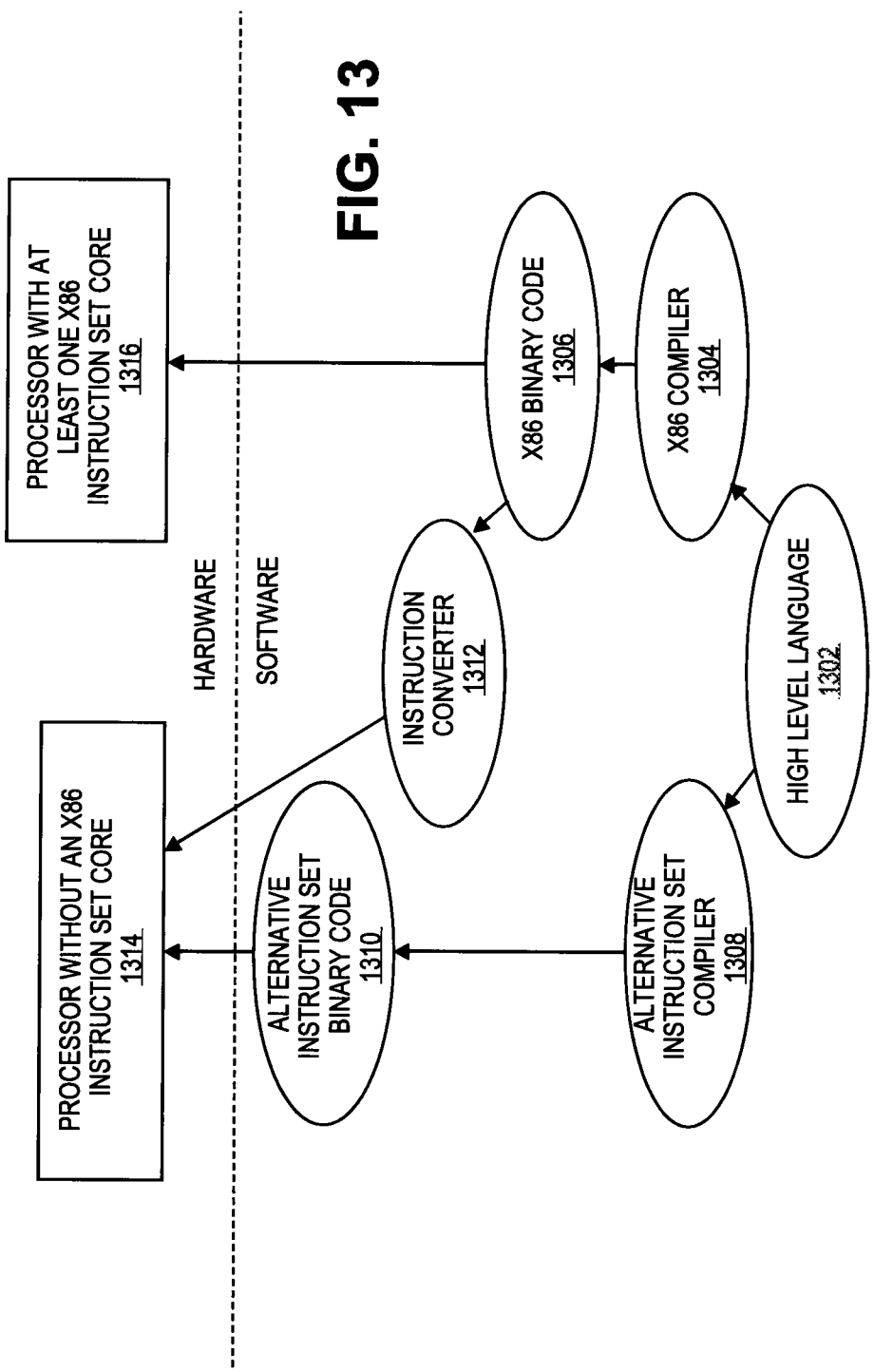
FIG. 13 illustrates a system to translate instructions according to one embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Fuse Validation

Embodiments of the present invention involve an instruction and logic for fuse validation that may be employed in an integrated circuit, such as, for example, a processor, System-on-Chip (SoC), controller, or other structures described above. The techniques may be used to validate fuse values in a fuse array or memory structure. The fuse values are typically programmed into the array. In one embodiment, the fuse values are validated without revealing their specific values to the testing environment.

Figure 20:
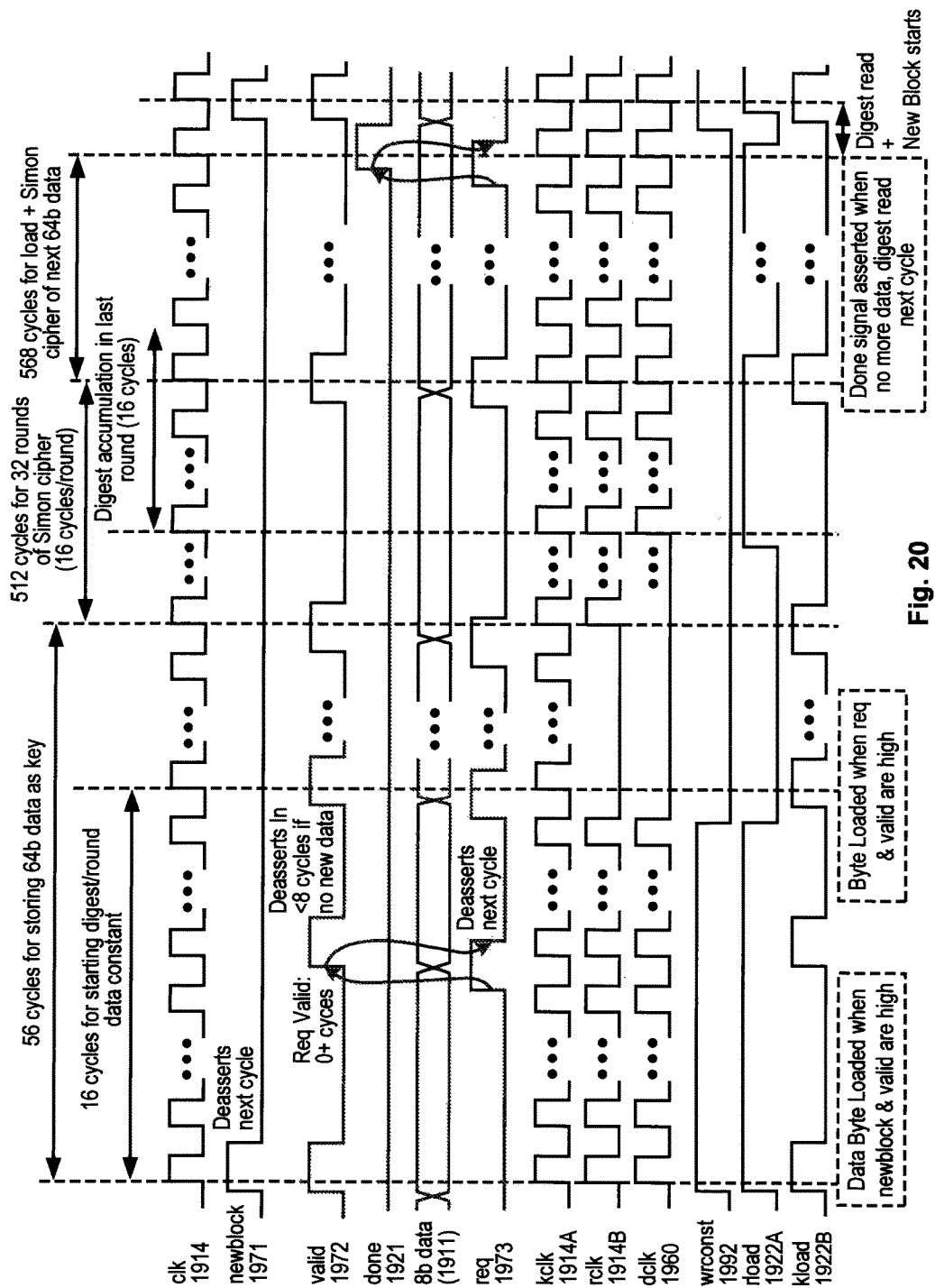
FIG. 20 illustrates a timing diagram depicting the operation of the fuse hash circuit of FIG. 18.
Figure 21:
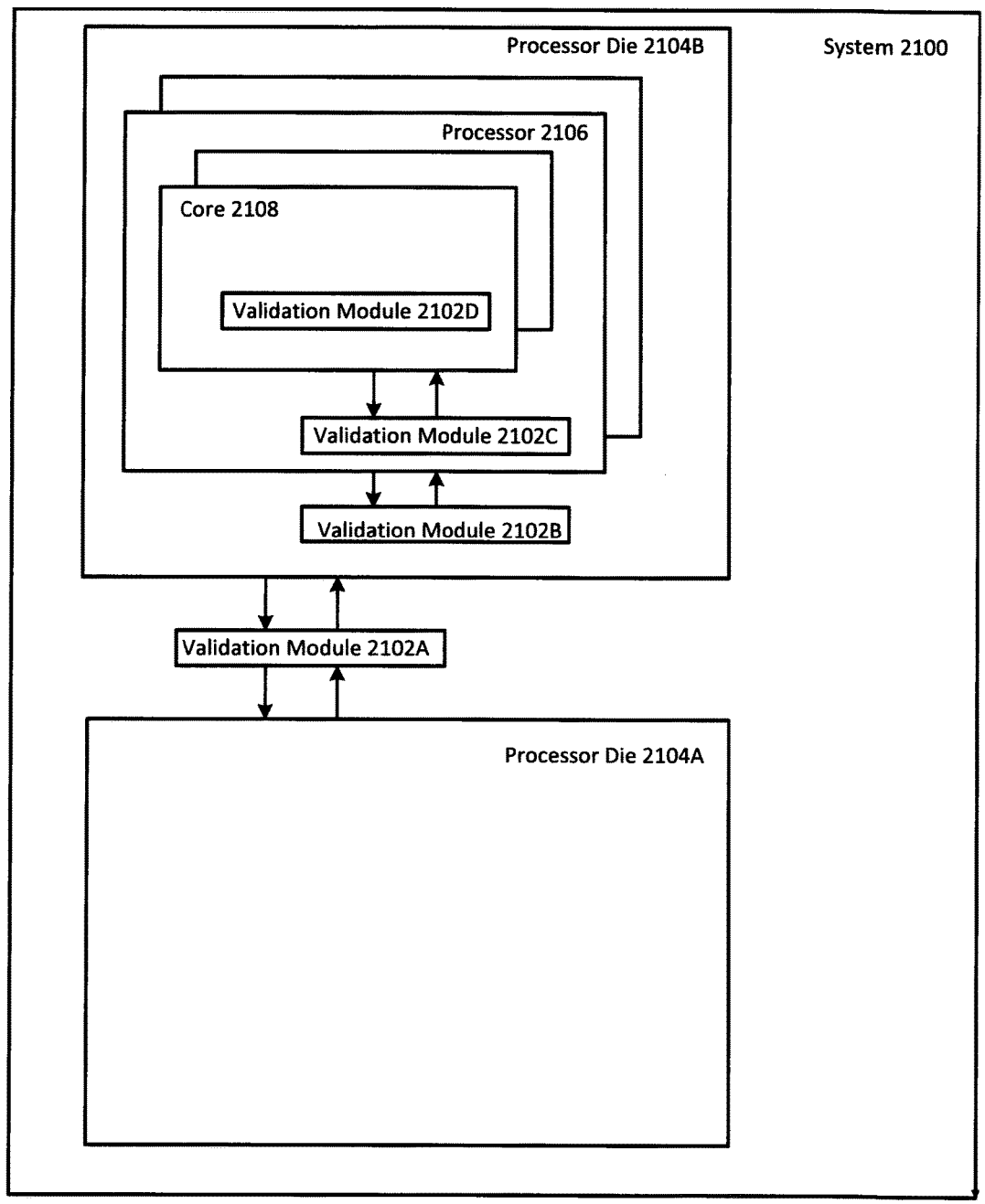
FIG. 21 illustrates an example of a system for implementing Simon cipher based hashing fuse validation.

FIG. 21 illustrates an example system 2100 for implementing Simon cipher based hashing fuse validation. Simon block ciphers may be implemented in numerous different ways. Various portions of system 2100 may be implemented by elements shown in FIGS. 1-20. In system 2100, Simon cipher based hashing fuse validation may be implemented fully or in part by a validation module 2102. Validation module 2102 applies a Simon cipher based hashing algorithm to a block given a key.

Furthermore, validation module 2102 may be implemented in any suitable portion of system 2100. The placement of validation module 2102 may depend upon a desired level of integrated operations, convenience, speed, or flexibility. For example, validation module 2102A may reside independently in system 2100 and may be accessed by one or more suitable entities of system 2100 such as a processor die 2104A, 2104B. Validation module 2102B may reside on a processor die such as processor die 2104B and may access and/or be accessed by one or more suitable entities of processor die 2104B such as processors 2106. Validation module 2102C may reside on a processor as processor 2106 and may access and/or be accessed by one or more suitable entities of processor 2106 such as cores 2108. Cipher module 2102D may reside on a core such as core 2108 and may access and/or be accessed by one or more suitable entities of core 2108. For example, validation module 2102 may access a memory in one of the entities mentioned above and perform validation on all or a portion of the data stored therein.

In one embodiment, a fuse microarchitecture comprises a Simon-cipher fuse hashing circuit. In one embodiment, the Simon-based fuse hashing circuit comprises a 842-gate Simon-based fuse hashing circuit that enables secure on-die HVM fuse validation with a compact bit-serial implementation that occupies 17× lower die area compared to conventional SHA-based hashing circuits.

In one embodiment, the fuse hashing circuit employs the lightweight 32/64 Simon-cipher in a Merkle-Damgard construction, where 64b chunks of the fuse data are used as the key to recursively encrypt a 32b initial value (IV). After 32 Fiestel rounds of encryption using on-the-fly derived round keys, the resulting 32b cipher is accumulated into a running 32b hash digest. In one embodiment, the resulting cipher is accumulated using accumulation circuitry. In one embodiment, the accumulation circuitry implements logic gates. In one embodiment, the accumulation circuitry performs an XOR operation (e.g., an XOR gate) to accumulate the ciphertext outputs from the hashing circuit into a running hash digest. This hash digest is fed back as the next IV that is input into the Simon cipher that is then encrypted using the next 64b chunk of fuse data as the new key. This recursive block-chaining continues until all fuse data bytes in the fuse array have been consumed. The accumulated 32b digest that is left over at the end of this process is read out as the final hash value. The Simon-cipher is well-known in the art. For example, see Beaulieu et al., "The SIMON and SPECK Families of Lightweight Block Ciphers," Cryptology ePrint Archive, Report 2013/404.

The Simon-cipher hashing circuit is implemented in a number of ways. Different implementations offer different area/performance trade-offs. Both designs also offer significant area savings over conventional SHA-based hashing schemes. In one embodiment, the hashing circuit has a 1302-gate 1-round/cycle 16-bit parallel 32b/64b Simon-cipher based fuse hash circuit. This represents a greater than 11× lower area in comparison to a conventional SHA-256 design. In another embodiment, the hashing circuit has a 842-gate bit-serial implementation. In this case, the hash circuit further reduces the area by 35% for a total area of 842 gates, which represents an overall 17× area savings in comparison to a conventional SHA-256 design.

Figure 14:
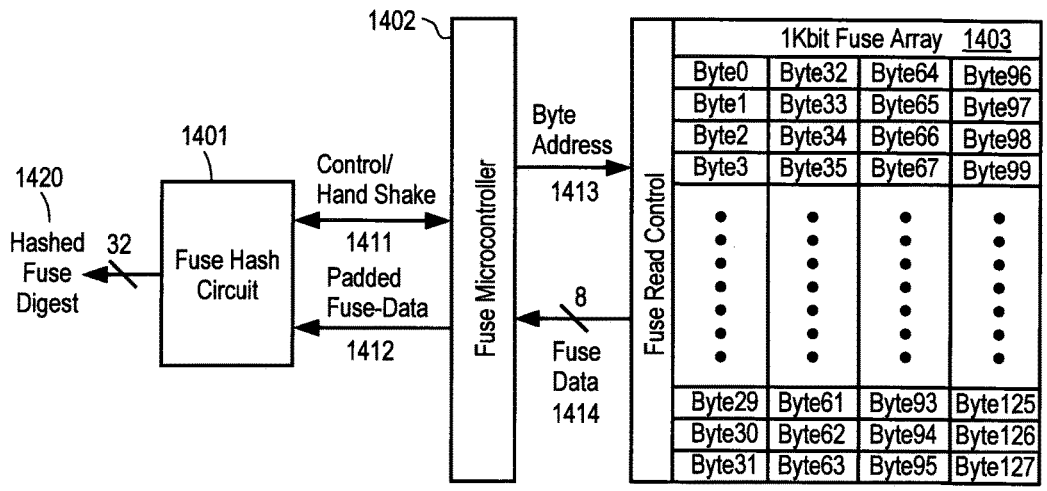
FIG. 14 is one embodiment of a high volume manufacturing (HVM) fuse validation micro-architecture.

FIG. 14 illustrates one embodiment of a HVM fuse validation micro-architecture. Referring to FIG. 14, the fuse validation microarchitecture comprises a fuse array 1403 that stores multiple fuse values. In one embodiment, the fuse validation microarchitecture is part of an integrated circuit, such as a processor, controller, or other device, such as those, for example, disclosed above. In one embodiment, each fuse value is stored as 8 bits of data.

In one embodiment, one or more of the fuse values in fuse array 103 comprises encryption keys. In another embodiment, the fuse values comprise configuration data to enable or disable options or features in the integrated circuit. In yet another embodiment, the fuse values comprise firmware data values. The fuse values may comprise a combination of encryption keys, configuration data, and firmware data. In one embodiment, fuse array 1403 is a 1K bit fuse array.

The validation microarchitecture further includes fuse microcontroller 1402 that accesses fuse array 1403. In one embodiment, fuse microcontroller 1402 accesses fuse array 1403 using an address, such as, for example byte address 1413. Fuse array 1403 includes fuse array read control logic that receives the byte address 1413 and provides fuse data 1414 back to fuse microcontroller 1402 in response thereto. Fuse microcontroller 1402 provides fuse data from fuse array 1403 to fuse hash circuit 1401. In one embodiment, fuse microcontroller 1402 provides the fuse data with padding, and is referred to herein as padded fuse data 1412. The exchange of fuse data between fuse microcontroller 1402 and fuse hash circuit 1401 is controlled by the control/handshaking signals 1411. These will be described in more detail below.

In response to the padded fuse data 1412, fuse hash circuit 1401 performs a Simon cipher on the data as described above and in further detail below to produce a hashed fuse digest 1420. In one embodiment, hash fuse digest 1420 is a 32 bit value created from an output of fuse hash circuit 1401.

More specifically, in one embodiment, the 1 Kbit fuse array data 1403 is accessible at any byte boundary, with requests arbitrated by fuse microcontroller 1402. During a fuse validation mode that occurs during HVM testing or debug mode, the entire contents of fuse array 1403 are hashed by fuse hash circuit 1420 to generate a 32b digest that may be read-out through an interface on the integrated circuit. This may be a JTAG or scan interface.

Figure 15:
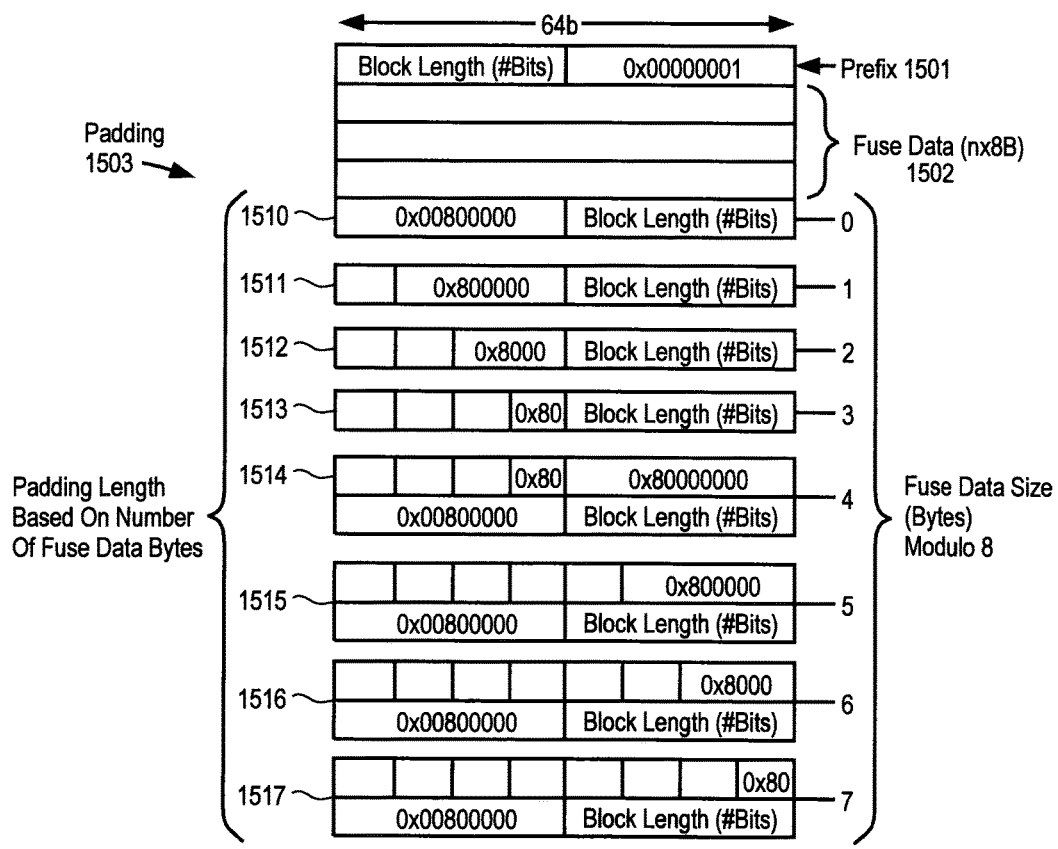
FIG. 15 illustrates a fuse data size dependent prefix and padding in accordance with one embodiment.

In one embodiment, fuse hash circuit 1401 operates on 64b data. However, the fuse data is 8 bits in length. In one embodiment, fuse microcontroller 1402 prepends the fuse data with an 8 byte (64b) prepend and appends an addend to the fuse data that includes a constant and a number of bits; however, the size of the addend (at the end) in number of bits can vary so as to make the total size a 64b multiple. FIG. 15 illustrates one embodiment of fuse data size dependent prefix and padding that is employed by fuse microcontroller 1402.

Referring to FIG. 15, in one embodiment, fuse microcontroller 1402 produces padded fuse data 1412 from the fuse data that by adding a prefix 1501 before fuse data 1502 and includes a certain amount of padding 1503. In one embodiment, the prefix comprises a block length field having a certain number of bits followed by a constant (e.g., 0x00000001). The block length is a 32b field that contains the number of bits in the fuse data. In one embodiment, the constant does not change with fuse data size. Fuse data 1502 follows prefix 1501.

Padding 1503 follows fuse data 1502. In one embodiment, the amount of padding is based on the number of fuse data bytes. That is, the amount of padding 1503 depends on the fuse data size. In one embodiment, fuse microcontroller 1402 performs a Modulo 8 on fuse data 1502. If the results of performing Modulo 8 on fuse data 1502 fits into a byte, then the padding 1503 that is applied is shown as 1510. If the results of applying Modulo 8 to fuse data 1502 is one byte over the eight bytes, then padding 1503 that is used is shown in 1511 where the block on the left represents the extra byte of data. The padding data for three, four, five, six, seven extra bytes are shown as padding data 1513-1517, respectively.

After prepending prefix 1501 and appending padding 1503 to fuse data 1502, fuse microcontroller 1402 sends padded fuse data 1412 to fuse hash circuit 1401. Two light-weight fuse hashing circuits are described below in more detail: a 32b/64b Simon-cipher based hashing circuit with a 16b datapath; and a bit-serial 32b/64b Simon-cipher based hashing circuit.

One Embodiment of a 32b/64b Simon-Cipher Based Hashing Circuit with 16b Datapath In one embodiment, the 32b/64b Simon-cipher based hash circuit processes data in 8 byte (8B) bundles, starting with an 8 byte prefix and ending with padding bytes. In one embodiment, since fuse data can be accessed at any byte boundary with any byte length, appropriate padding of 5B-12B (FIG. 15) ensures the total data size (prefix, fuse data and padding) is a multiple of 8B for the Simon cipher. In addition to packing and supplying 8B data to the hash circuit based on a hand shake protocol, the fuse microcontroller also computes the fuse data size based prefix and padding bytes.

Figure 16:
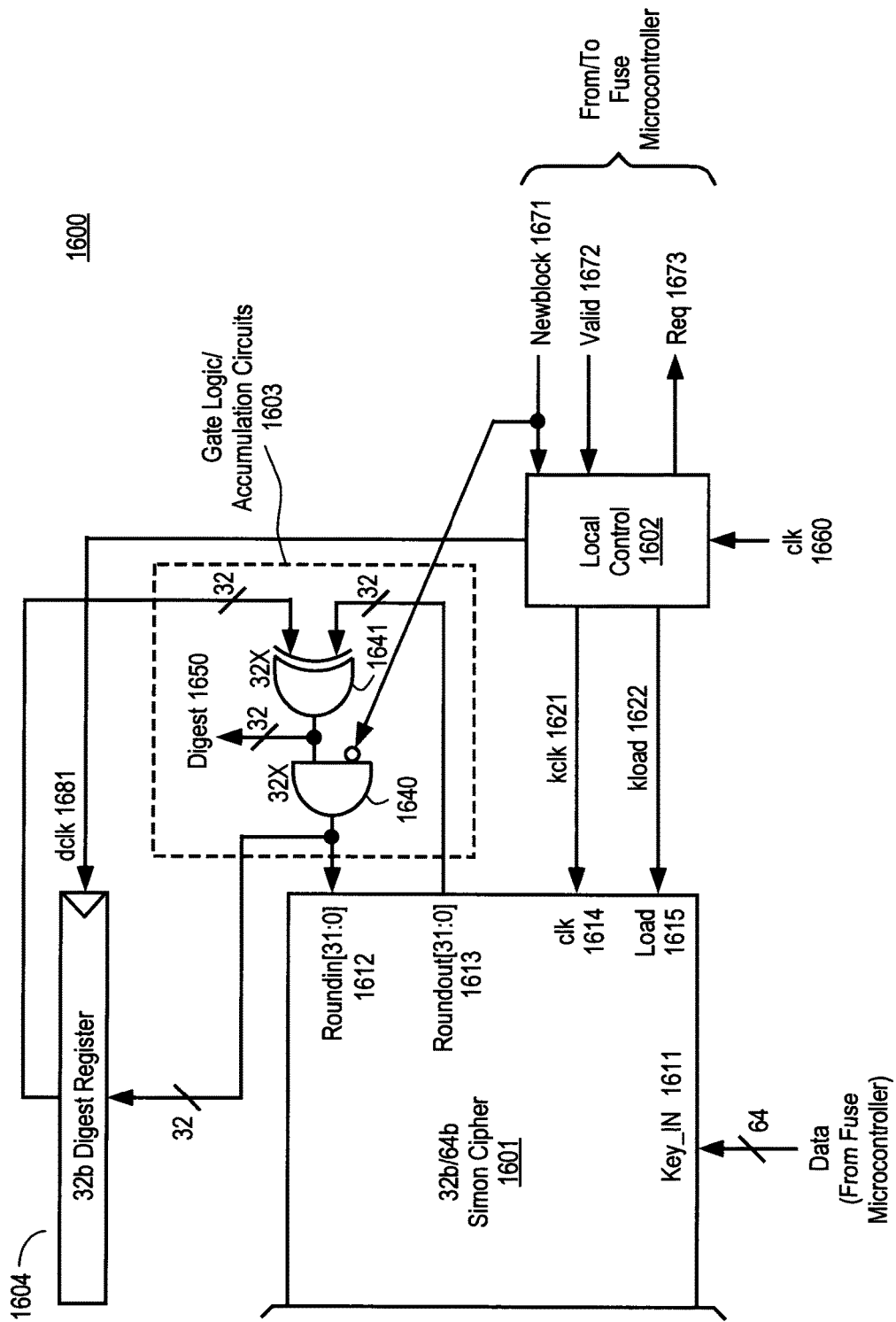
FIG. 16 illustrates one embodiment of a 32b/64b Simon-based fuse hash circuit.

FIG. 16 illustrates one embodiment of a fuse hashing circuit, such as fuse hashing circuit 1401 of FIG. 14. Referring to FIG. 16, in one embodiment, fuse hashing circuit 1600 comprises a 32b/64b Simon cipher 1601, digest accumulation gate logic (e.g., accumulation circuits) 1603, digest register 1604, and local control (controller) 1602.

The 8B data from the fuse microcontroller is loaded as the starting key (key input (key_in) 1611) for the Simon cipher 1601. Simon cipher 1601 receives plaintext at round input (roundin) 1612 and performs encryption based on a key received at key_in 1611 to produce the cipher text or hash output at round output (roundout) 1613. In one embodiment, roundin input 1612 and roundout output 1613 are 32 bit values and the key_in 1611 representing the key is 64 bits. In one embodiment, key_in 1611 is the padded fuse data from a fuse microcontroller (e.g., padded fuse data 1402 of FIG. 14 using the fuse data size dependent prefix and padding shown in FIG. 15).

In one embodiment, Simon cipher 1601 performs one cycle per round for 32 rounds to produce the cipher text at roundout 1613. That is, the cipher text is available and output from Simon cipher 1601 to gate logic 1603 after 32 round computations, with a 16-arrayed bitslice datapath (FIGS. 17A-C) for key generation/round logic and 1 round computation per cycle. Thus, the accumulation is done after the end of the 32 round computations.

At gate logic 1603, the resulting 32b cipher output from Simon cipher 1601 is accumulated, with a XOR operation, into a running 32b hash digest. More specifically, the other input to gate logic 1603 is the output of digest register 1604 which stores the value input into the roundin 1612 input during the last round of inputs that produced roundout 1613. Thus the gate logic combined these values to produce the next input to roundin 1612.

In one embodiment, gate logic 1603 comprises XOR gates 1641 having inputs that are connected to receive the ciphertext output at roundout 1613 and the value stored in digest register 1604. In one embodiment, XOR gates 1641 comprises a plurality of XOR gates, one for each bit of the input values. Thus, in one embodiment with the input values at 32 bits, there are 32 XOR gates. The output of XOR gates 1641 is digest 1650. Digest 1650 is output from the Simon-based fuse hash circuit after all the fuse data values from the fuse array have been input into Simon cipher 1601.

The output of XOR gates 1641 are input into AND gates 1640. The other input to AND gates 1640 is coupled to an inverted version of newblock signal 1671 from the fuse microcontroller. The output of AND gates 1640 represents the round input to roundin 1612. The output of AND gates 1640 also input into digest register 1604, for subsequent input to gate logic 1603 when the ciphertext is output from Simon cipher 1601. Thus, the updated (accumulated) hash digest is used as the starting 32b round data at roundin 1612 (i.e., the initial value (IV)) for the next 8B block of fuse data upon which Simon cipher 1601 is going to operate. Note that the IV for the initial block of fuse data from the fuse microcontroller can be any constant. In one embodiment, the constant is a 0 value in order to reduce gate count.

In one embodiment, Simon cipher 1601 (with 96 key/round storage flip-flops) and digest accumulation (with 32 digest storage flip-flops) circuits use separate clocks, namely kclk 1621 and dclk 1681, that are derived from the main clock, clk 1660. The dclk 1681 controls writing of accumulated digest into its 32b digest register 1604. In one embodiment, both kclk 1621 and dclk 1681 are not switching when Simon cipher 1601 is idle and waiting for new fuse data from the fuse microcontroller. In one embodiment, independent clock gating reduces the area overhead compared to using mux logic-based write enabled flip-flops with a single free running clock.

Figure 17A:
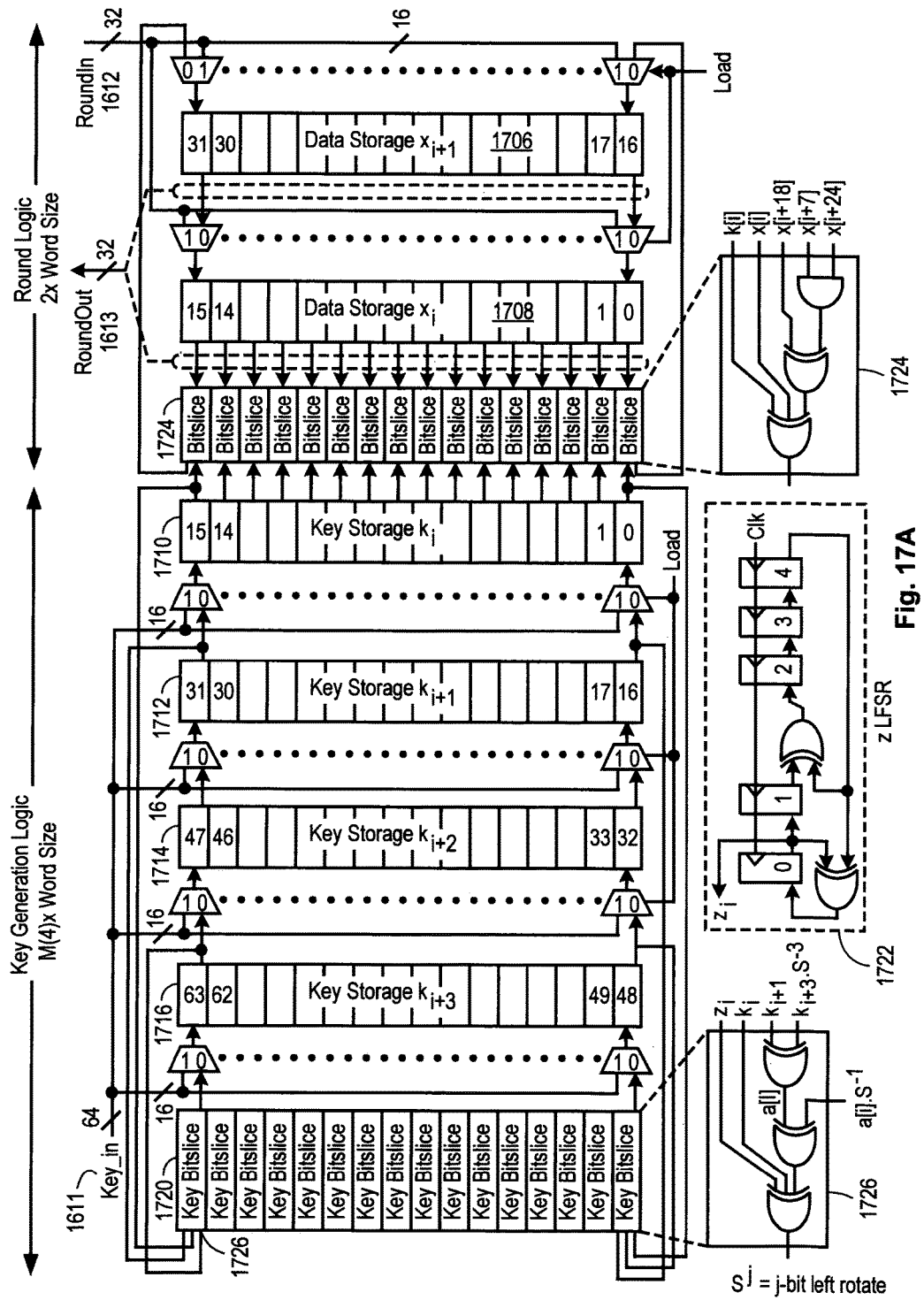
FIGS. 17A-C illustrate one embodiment of a 32b/64b Simon-cipher circuit with a 16b datapath.

FIG. 17A is an illustration of an example embodiment of Simon cipher 1601 of FIG. 16. In one embodiment, Simon cipher 1701 includes a zLFSR 1722 (a z-module) to provide a constant $z_j$ for use in determining a round key for key generation. In one embodiment, zLFSR 1722 provide $z_j$ as part of a key schedule in a manner well-known in the art. In another embodiment, zLFSR 1722 includes an area-efficient linear-feedback shift register circuit to generate a constant $z_j$.

In one embodiment, Simon cipher 1601 fully or in part implements a thirty-two-bit word and sixty-four-bit key Simon block cipher. However, any suitable sizes of words and keys may be used in conjunction with suitable adjustments to the elements of Simon cipher 1601. In one embodiment, Simon cipher 1601 implements a fully-parallel solution for a block cipher wherein all bits within the thirty-two-bit input roundin 1612 and the sixty-four-bit round key 1611 are transformed in parallel. The round words for an iteration i may be stored in data storage $x_i$ 1708 (including the lowest sixteen bits) and data storage $x_{i+1}$ 1706 (including bits sixteen through thirty-one). In one embodiment, data storage 1706 and 1708 implement the round word $x_i$ and $x_{i+1}$ components of FIG. 17B, which illustrates a Feistal map for a block cipher.

The round keys for an iteration i may be stored in key storage $k_i$ 1710 (including the lowest sixteen bits), key storage $k_{i+1}$ 1712 (including bits sixteen through thirty-one), key storage $k_{i+2}$. 1714 (including bits thirty-two through forty-seven), and key storage $k_{i+3}$1716 (including bits sixteen through thirty-two). In one embodiment, key storage 1710, 1712, 1714, and 1716 implement the round keys $k_i$, $k_{i+i}$, $k_{i+2}$, and $k_{i+3}$ illustrated in FIG. 17C.

Figure 17B:
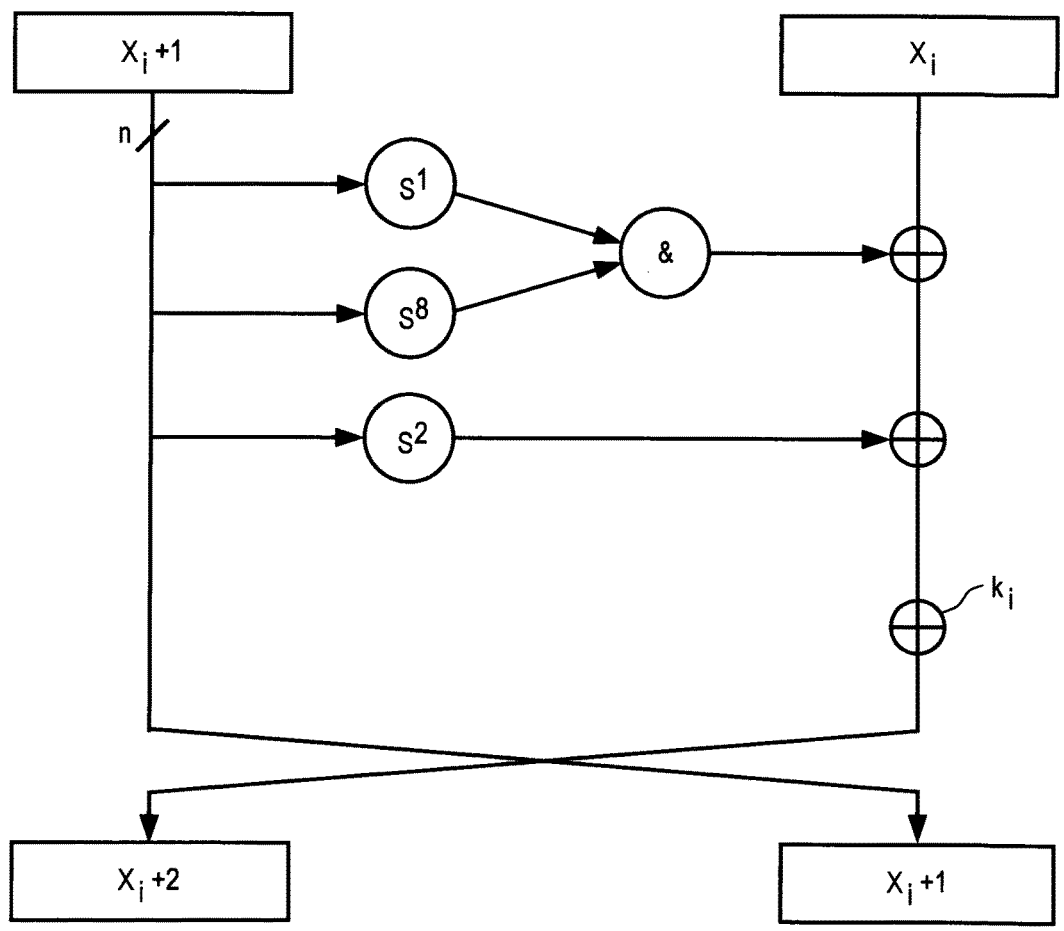

In one embodiment, operations of the Feistel graph shown in FIG. 17B are implemented by bitslice modules 1724, which performs transformational operations on a segment of data according to the Feistel graph of FIG. 17B. A bitslice module 1724 may be provided for each different bit position of the key storage and the data storage. In the example of FIG. 17A, this includes sixteen bitslice modules 1724, which may be grouped together into bitslice module bank 1718. In one embodiment, each bitslice module 1724 computes two bits ($x_i$ and $x_{i+1}$) of the iteration of the Feistel graph of FIG. 17B, embodying the transformation of Simon cipher 1601. Specifically, bitslice module 1724 rotates $x_{i+1}$ (1706) to the left one bit, rotates $x_{i+1}$ (1708) to the left eight bits, and performs a bitwise AND on the two results. Then, bitslice module 1724 applies an XOR to this result and $x_i$ (1708). Then, bitslice module 1724 applies an XOR to this result and the result of rotating $x_{i+1}$ (1706) to the left two bits. Then, bitslice module 1724 applies an XOR to this result and the round key (1710).

Example logic to perform these operations is illustrated in the more detailed illustration of bitslice module 1724. Thus, each bitslice module 1724 accepts as input a parallel one of data storage $x_i$ 1708, a parallel one of data storage $x_{i+1}$1706, and a parallel one of key storage $k_i$ 1710. The logic operation illustrated by FIG. 17B represents a single round of operation. After all thirty-two rounds of cipher operations are complete, roundin data 1612 is transformed using an input key 1611 and the output of bitslice module bank 1718 makes up the output of Simon cipher 1601.

Figure 17C:
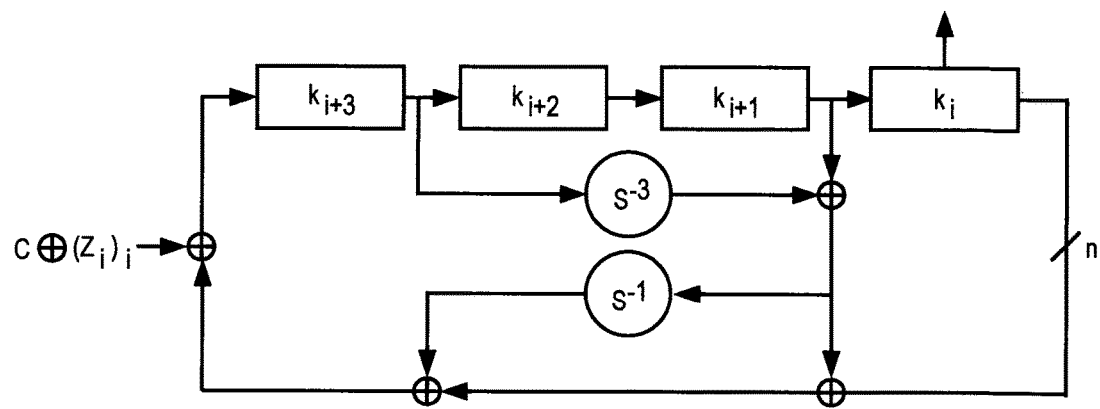

In one embodiment, operations of the four-key expansion shown in FIG. 17C are implemented by key bitslice module bank 1720. In one embodiment, key bitslice module bank 1720 include individual elements of logic such as key bitslice modules 1726 corresponding to the number of parallel computations performed by Simon cipher 1601. This in turn may correspond to each different bit position of the key storage and the data storage. In the example of FIG. 17A, this may include sixteen key bitslice modules 1726. In one embodiment, each key bitslice module 1726 computes the round key $k_{i+3}$ (1716) which may be propagated for subsequent round key portions (1710, 1712, and 1714). Specifically, key bitslice module 1726 applies an XOR to $k_{i+3}$ (1716) rotated right three bits and $k_{i+1}$ (1712), yielding a first result. Key bitslice module 1726 applies an XOR to the first result and to $k_i$ (1710), yielding a second result. Key bitslice module 1726 applies an XOR to the first result rotated right by a bit and the second result, yielding a third result. Key bitslice module 1726 applies an XOR to the third result and to a key schedule constant provided by zLFSR 1722. The result is fed to $k_{i+3}$ (1716). During operation of the four-key expansion, the current round key $k_i$ is made available for use by, for example, bitslice modules 1724. Example logic to perform these operations is illustrated in the more detailed illustration of key bitslice module 1726. Thus, each key bitslice module 1726 accepts as input a parallel one of key storage $k_i$ 1710, a parallel one of key storage $k_{i+1}$ 1712, and a parallel one of key storage $k_{i+3}$ 1716. The bitslice module for the least significant bit remains these inputs and the constant from the zLFSR 1722. Each key bitslice module 1726 outputs the determination to a parallel one of key storage $k_{i+3}$ 1716.

Simon cipher 1601 may include any suitable number of elements to accomplish parallel operations of the transformation. For example, loading of registers for data and key storage may be gated by multiplexers, which synchronize filling such registers using a load signal. At the end of a cycle, roundout 1613 is written into a data register for the next round computation. The output of round keys is similarly produced by each key bitslice module 1726 consuming a one-bit round constant from zLFSR 1722.

In one embodiment, zLFSR 1722 outputs a stream of single bit constants, given the particular word and key sizes of Simon cipher 1601, of "11111010001001010110000111100110". If Simon cipher 1601 included other word or key sizes, a different appropriate constant may be selected according to the Simon algorithm. To output such a stream of single-bit constants, a shift register of a number of bits equal to the width of this constant stream may be used. For example, given the thirty-one different constants, zLFSR 1722 may include a shift register of thirty-one bits. However, in one embodiment zLFSR 1722 may be implemented logic to reduce the number of flip-flops, latches, or other memory locations necessary to store the constant stream.

The expanded view of zLFSR 1722 illustrates this reduced usage of flip-flops in FIG. 17A. Instead of thirty-one sequential flip-flops to implement a shift register for the stream "11111010001001010110000111100110," five may be used. Other embodiments of the Simon cipher may use a different pattern or length of constant bit-stream. As a result, the configuration and/or number of flip-flops required to implement the LFSR may change accordingly. The resulting circuit size will still be much smaller than having a long shift register with the constant directly inside it. The output of the lowest flip-flop, "0", may be the output of zLFSR 1722. Furthermore, the output of flip-flop "0" may be routed to flip-flop "1". In addition, an XOR may be applied to the output of flip-flop "0" and the output of flip-flop "4". The result of this XOR may be sent to the input of flip-flop "0". An XOR may be applied to the output of flip-flop "1" and the output of flip-flop "4", and the result may be routed to the input of flip-flop "2". The output of flip-flop "2" may be routed to flip-flop "3", and the output of flip-flop "3" may be routed to flip-flop "4."

Referring back to FIG. 16, local control 1602 performs the loading of data into Simon cipher 1601 as well as handshaking between itself and the fuse microcontroller (e.g., fuse microcontroller 1402 of FIG. 14). In one embodiment, local control 1602 uses newblock signal 1671, valid signal 1672, and req (request) signal 1673 to interface with the fuse microcontroller.

Newblock signal 1671 is asserted to indicate that the key_in input 1611 is available from the fuse microcontroller; this is the first 8 bytes of a new padded fuse array block (of any size) and this resets the hash digest to a predetermined starting constant. When this is asserted, AND gates 1640 input a predetermined data value into roundin 1612. In one embodiment, all 32 bits of roundin 1612 are zero. However, it is not required that the initial input start with all zeros; any value can be used as the starting value. Also each time newblock signal 1671 is asserted, valid signal 1672 is also asserted.

In one embodiment, after 32 rounds, local control 1602 asserts a req signal 1671 to fuse microcontroller to indicate that it is done with the data and it can take another 8 bytes of key data at key_in input 1611. In response, fuse microcontroller sends another 8 bytes of data or if the data has already been sent by fused microcontroller, the fused microcontroller signals valid signal 1672 to indicate to local control 1602 that the data is available on key_in input 1611. Local control 1602 also asserts the clock signal kclk 1621 and a load signal referred to as kload signal 1622. Clock signal kclk 1621 provides the clock signal to clk 1614 to clock logic in Simon cipher 1611. In one embodiment, the load signal referred to herein as kload signal 1622 indicates to key generation logic in Simon cipher 1601 that the key data for each of the key storage areas should be loaded from key_in 1611 as opposed to using intermediate key values that have been generated in the last set of rounds based on the previous fuse data that had been received by the Simon cipher 1601. In this case, kload signal 1622 allows the key data input to key_in 1611 to be loaded in parallel into a set of key storage blocks in the key generation logic.

Figure 18:
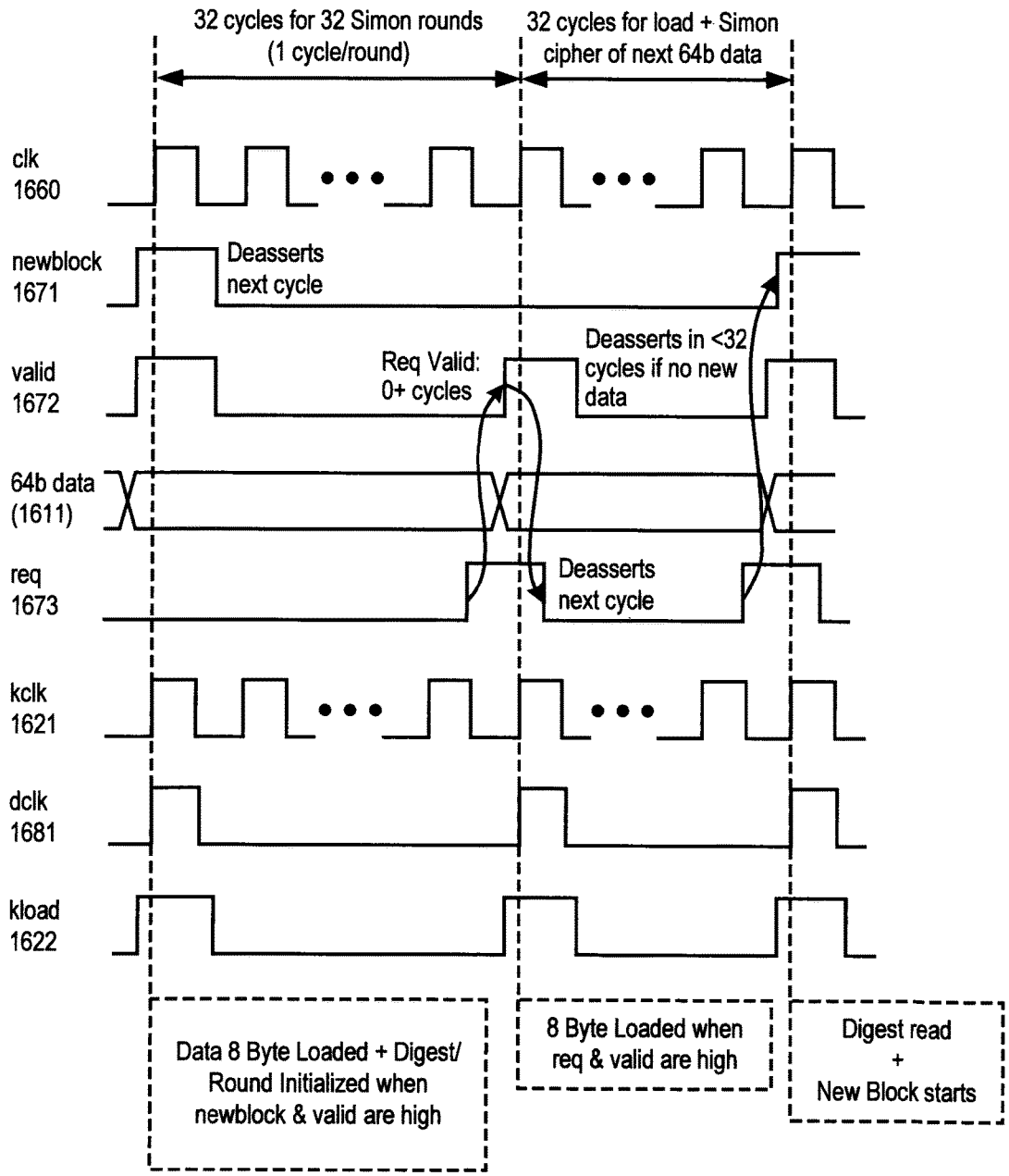
FIG. 18 illustrates a timing diagram depicting the operation of the fuse hash circuit of FIG. 16.

FIG. 18 illustrates timing diagram for one embodiment of 16b fuse hash circuit of FIG. 17A-C. The timing diagram in FIG. 18 shows the operation of the circuit with the control signals. In one embodiment, every 8B data is accompanied by an asserted valid from the fuse microcontroller. Assertion of newblock signal 1671 resets the state of the hash digest/ round data to 0 and forces the first 8B of a new block of fuse data to be loaded, with kload signal 1622 controlling the appropriate multiplexing (muxing) logic in Simon cipher 1601. The local control overhead is reduced by using the existing value in z-LFSR 1722 of Simon cipher 1601 to track round computation state. At the end of 32 rounds, after producing cipher for 8B of fuse data, a request to the microcontroller for new data is sent by asserting req signal 1673. Thereafter, the data is loaded only when the input valid signal 1672 is high, after which req signal 1673 is de-asserted by local control 1602. De-assertion of newblock signal 1671 and valid signal 1672 is controlled by fuse microcontroller 1402. The hash digest is read out after processing of the last 8B block of data (including padding) is completed.

Referring to FIG. 18, if there is 120 bytes of fuse data that are converted by the Simon based fuse hash circuit into a 32 bit hash. When clk 1660 comes in, new block signal 1671 is asserted when a new block of data is being input into Simon cipher 1601. At this point, newblock signal 1671 also causes roundin 1612 to be set to zero. At the same time newblock signal 1671 is asserted, valid 1672 is asserted to cause the new 8 byte fuse data to be presented at key_in 1611. Gate logic/accumulation circuit 1603 uses the accumulated digest value up to the last 8 byte fuse data and combines it with the current ciphertext (roundout) to produce the current accumulated digest. At the same time, the 64 bit data (1611) is loaded into the Simon cipher from the fuse microcontroller 1402. The digest register is updated on dclk 1681. The initial value is stored into digest register (1604) when newblock signal 1671 is asserted; after that, the accumulated hash value is asserted after 32 Simon cipher rounds with each 8 bytes of fuse data. In one embodiment, this is asserted once every 32 cycles. The clock signal kclk 1621 is asserted 32 times for each 8 bytes of fuse data. In one embodiment, the cipher circuit takes 32 cycles for 32 rounds (1 cycle/round), then kclk 1621 has 32 pulses.

In one embodiment, kclk 1621 is idle when req signal 1673 is asserted and valid signal 1672 is not yet been asserted (because fuse microcontroller 1402 is getting the data).

At the end of 32 rounds (32 cycles), req signal 1673 is asserted high by local control 1602. After req signal 1673 and valid signal 1672 have been asserted, req signal 1673 deasserts during the next cycle. When both req signal 1673 and valid signal 1672 are high, new data is loaded into Simon cipher 1601. Similarly valid signal 1672 deasserts in less than 32 cycles if there is no new data. Req signal 1673 deasserts to indicate to fuse microcontroller 1602 that it does not want any more data while its processing the current data. This causes fuse microcontroller 1602 to deassert valid signal 1672.

This process repeats every 32 cycles or rounds until all the fused data has been inputted into Simon cipher 1601 and been processed, after which the digest is read out.

In one embodiment, the zLFSR circuit goes through the 31 states to control the operation of local control 1602, thus in this case zLFSR acts as a counter. In one embodiment, the local circuit 1602 has an extra flip-flop to enable counting until 32 along with the existing LFSR inside Simon cipher block. An alternate embodiment, the valid/req handshaking is not necessary if the data generation applied to the Simon cipher circuit isn't the same numbers of cycles as the Simon circuit processing the data. For example, if the timing is such that the data can be made available every 32 cycles, then no hand shaking would be required and the next set of data to be used as the key would be made available at the proper time.

In one embodiment, the latency to hash 1 Kbit of fuse data with associated prefix/padding is 576 clock cycles (at 32 clock cycles for 8B) using the hash circuit with a Simon cipher as described above.

(ii) Bit-Serial 32b/64b Simon-Cipher Based Hashing Circuit

Figure 19:
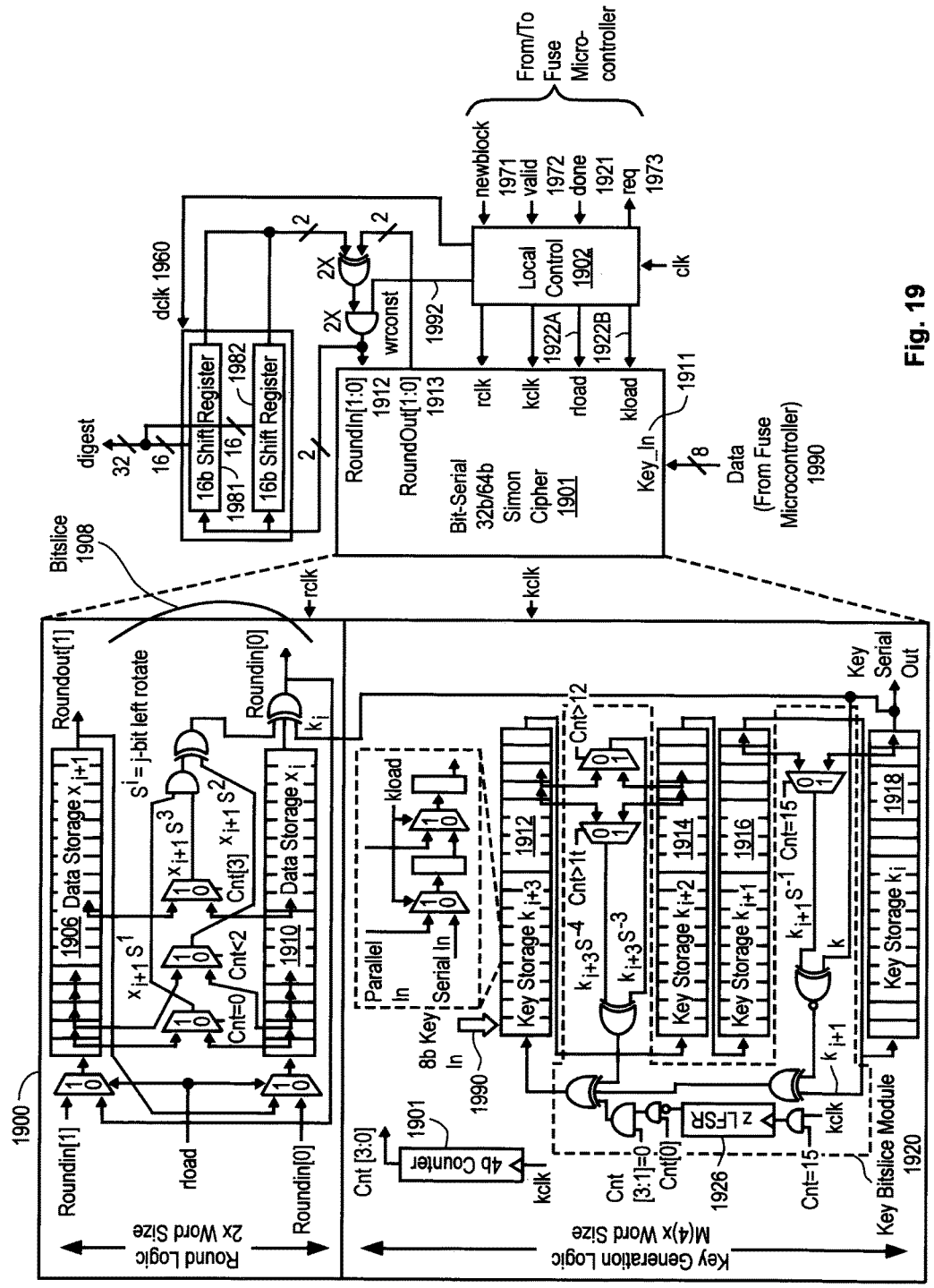
FIG. 19 illustrates one embodiment of a bit-serial fuse hash circuit.

FIG. 19 illustrates one embodiment of a bit-serial fuse hash circuit. Referring to FIG. 19, in one embodiment, Simon cipher 1900 applies a single bitslice computation per cycle to determine its output (roundout). In another embodiment, Simon cipher 1900 applies a single key bit generation per cycle. Simon cipher 1900 is reduced to having one bit slice instead of sixteen for the round logic and the key generation logic, and all the key, round and digest registers operate as 16b shift registers to enable bit-wise computation using a single bitslice datapath.

In comparison to a parallel arrangement described in FIG. 17A, such a bit-serial operation of Simon cipher 1900 may have much less throughput. However, Simon cipher 1900 may be implemented on less combinational area than such parallel implementations.

While the fuse hash circuit of FIG. 17A loads data bits in parallel, the bit serial embodiment of FIG. 19 may be used to process the data one bit at a time. Because of this, the digest and the hand shaking to load the hash circuit is modified from that which is done for the hash circuit in FIG. 17A. In this case, the data from the fuse array comes in as a byte and the 8-bits are loaded in parallel into one of the key storage registers. This is shown as bit locations 1990. Note also that while eight bits are provided from the fuse controller, the fuse data is still padded as shown in FIG. 15.

After the data is input in parallel, the rest of that circuit handles the bits serially. In one embodiment, because the bits are handled serially, sixteen cycles are needed to complete one round.

In one embodiment, Simon cipher 1900 employs a sixteen-bit word-size datapath, analogous to the word sizes used in FIG. 17A. In one embodiment of Simon cipher 1900, the output of bitslice module 1908 is written to the top of data storage $x_{i+1}$ 1906. Furthermore, output of key bitslice module 1920 may be written to the top of key storage $k_{i+3}$ 1912. During each cycle, data may be passed from high to low within a given storage 1906, 1910, 1912, 1914, 1916, and 1918. Furthermore, when data is to exit the given storage, it may pass to a successive storage (i.e., i+3 to i+2, to i+1, to i).

In one embodiment, Simon cipher 1900 may include a counter 1901 to determine what position of a given word is being calculated. The size of the counter may depend on the size of the words used in the Simon cipher module. In the example of FIG. 19, counter 1901 includes four bits to track the sixteen different positions of the storage in Simon cipher 1900. Local control (circuit) 1902 also uses this count value, in addition to the z-LFSR, to not only track completion of 32 rounds but also track byte-based loading for an 8B fuse data bundle. In one embodiment, Simon cipher 1900 issues one round of transformed data every sixteen clock cycles.

Bitslice module 1908 may accept input in the form of individual bits taken from data storage $x_{i+1}$ 1906, data storage $x_i$ 1910, and key storage $k_i$ 1918. Bitslice module 1908 may output individual bits which may be the output of Simon cipher module 1900. Key bitslice 1920 may accept input in the form of individual bits taken from the bottom of key storage $k_i$ 1918, key storage $k_{i+1}$ 1916, key storage $k_{i+3}$ 1912, and a z-LFSR 1926. The z-LFSR 1926 may be implemented in any suitable manner. The output of key bitslice module 1920 may be serialized and applied to $k_{i+3}$. Input 1912 may be serialized, as may be input key 1990.

As processed bits are written into a most-significant-bit position of a given storage, any word-size rotate operations (such as those used within key expansion or round calculations) that depend on unprocessed bits at those locations may have to accommodate for such unprocessed bits. Bitslice module 1908 and key bitslice module 1920 may use the bit counter value to multiplex between storage positions to account for unprocessed bits.

In one embodiment in the expanded view of bitslice module 1908, the output of shift operations as part of implementing the Feistel graph of FIG. 17B may be held. These may be held if insufficient bit processing has been performed such that meaningful data would reside in the referenced locations. In another embodiment, the output of shift operations of key bitslice module 1920 as part of implementing key expansion as shown in FIG. 17C may be similarly held. These may be held if insufficient bit processing has been performed to provide meaningful data.

In one embodiment, the operation of the output of the zLFSR 1926 may be held to match the serial operation elsewhere in Simon cipher 1900. For example, a clock of zLFSR 1926 may be gated by the count of counter 1901 such that the constant that is output from zLFSR 1926 remains the same until a full round of processing is completed.

In one embodiment, digest accumulation uses only a pair of XOR gates for bit-wise operation as well. That is, because the bit serial fuse hash circuit operates serially, only two XOR gates are needed and generates two bits of the digest at a time. Those bits are clocked through to a pair of registers 1981 and 1982, which are clocked by the dclk 1960 and from which the digest is output.

The requirement of the fuse microcontroller to pack byte-based fuse data into 8B bundles is also simplified by feeding data to the bit-serial fuse hash circuit in byte level granularity. The data loading mux logic is removed for most of the key storage registers in the Simon cipher circuit by loading all fuse data bytes into the most significant byte only and then serially shifting into the appropriate position within the 64b storage. This requires that data be fed by the fuse microcontroller in least significant to most significant byte order.

The accumulation circuits (to, e.g., implement logic gates) and the local control 1902 achieve the same overall functionality as the hash circuit in FIG. 17A but with bit-serial operation. A done signal 1921 is added to indicate that the digest value may be read out of the hash circuit (i.e., all the fuse values have been processed by the hash circuit). In one embodiment, the digest can be read in the cycle after the done signal is asserted.

Due to different bit-widths of key and round storage, their bit-wise loading requires different number of clock cycles. To accommodate this, two local clocks from local control 1902 are used within the bit-serial Simon cipher block—the rclk is only used by registers in the round logic and kclk is used by all other registers. Furthermore, for the same reason, two load signals are necessary, rload and kload signals.

Another difference with local control 1902 is that newblock signal 1971 is used to indicate new data is available, which was asserted for only one cycle in the Simon based fused circuit of FIG. 16. In this embodiment of the bit serial fuse hash circuit, newblock signal 1971 is still valid for only one 16 clock cycle but is converted internally into a new signal, wrconst signal 1992, that is then asserted for 16 clock cycles. Alternately, in an embodiment in which fuse microcontroller 1402 guarantees that newblock signal 1971 will be held for 16 cycles, local control 1902 may not need to generate a derived signal wrconst 1992 and may use inverted newblock signal directly with the AND gates in the accumulation logic.

In addition to asserting req signal 1973 at the end of 32 rounds, local control 1902 also asserts req signal 1973 after the load/serial shift of every byte during 8B fuse data load phase.

Local control 1902 also generates a dclk 1960 for the digest shift registers 1971 and 1972—resulting in a total of 3 derived clocks from the main clock.

Newblock signal 1971 may only be valid for a single cycle, accompanying the first byte of a new block of data to be hashed, but for bit-wise shift-in of the constant into the round/digest registers the local control asserts wrconst signal 1992 for 16 cycles. A starting constant of all 0s enables this logic to require only a pair of AND gates (shown in FIG. 19). This is concurrent with data load operation into the Simon key registers. Thereafter, bit-wise loading into the accumulated digest/round logic is concurrent with last round computation—saving 16 cycles per 32 rounds.

FIG. 20 illustrates one embodiment of timing diagram for bit-serial fuse hash circuit of FIG. 19. In one embodiment, hand-shaking protocol with the fuse microcontroller remains the same as in the hash circuit of FIG. 17A, except that the done signal 1921 is asserted by the fuse microcontroller when local control 1902 asserts req signal 1973 at the end of accumulating the digest from the last 8B data.

Local control 1902 asserts req signal 1973 multiple times to load the entire 8B for Simon cipher 1900, with 56 cycles minimum to load all 8B. In one embodiment, the cipher computation over 32 rounds requires 512 cycles (16 cycles/round).

During data loading phase, after every req signal 1973 assertion, fuse microcontroller 1402 sends a new byte of data and asserts valid signal 1972. This then causes data to be loaded into the keys (with kload signal 1922B asserted) on the next clock. The req signal 1973 then deasserts, and in response fuse microcontroller 1402 deasserts valid signal 1972. The req signal 1973 will get reasserted only after this 8b of data is serially shifted within the key registers. As a result, req signal 1973 will reassert to request the next byte only 8 cycles later. Once all 8 bytes are loaded into the key registers, req signal 1973 does not get reasserted until 32 rounds of Simon cipher 1901 (512 cycles in this embodiment) have completed before requesting the next fuse data byte.

Local control 1902 uses four bit counter 1901 inside Simon cipher 1901 to keep track of each round completion and also when every byte of data is shifted in after loading.

In this Simon cipher embodiment, the minimum latency to hash 1 Kbit of fuse data with associated prefix/padding is 10225 clock cycles (at 568 clock cycles for every 8B and an extra cycle at the end).

For bit-serial operation, alternative embodiments with multiple bits per cycle may be used. These still require multiple cycles per round with fewer bitslices than the parallel implement described above and more bit slices than the completely serial version described above. For the bit-serial version, in one embodiment, the latency for key loading is hidden by overlapping this operation with the last four rounds (for 64b key size) so that the shortest latency between successive fuse data is 512 cycles. For the bit-serial version, in one embodiment, smaller or larger fuse data could be loaded in parallel but the bit-serial operation still occurring in a similar manner. For the bit-serial version, embodiments could use a different fuse data load order (within every 8B) based on where the load multiplexors are placed with respect to the key storage.

Note that other embodiments of the hash circuit use the Simon cipher with different text and/or key sizes.

The disclosed hash circuits enable validation of fuse programming during HVM testing or debugging failures on customer returned dies while securing on-chip fuse-based data with ultra-compact hashing circuits.

The disclosure sets forth a number of example embodiments, including, but not limited to the example embodiments below.

Example 1 is a processor comprising a memory the memory to store a plurality of values; and a hash circuit comprising a Simon cipher circuit operable to apply a Simon cipher to each of the plurality of values and to generate an output for each of the plurality of values circuitry coupled to the Simon cipher circuit to combine outputs from the Simon cipher circuit for each value of the plurality of values into a hash digest that is indicative of whether the values in the memory are valid.

Example 2 is the processor of example 1 that optionally includes that the memory comprises a fuse array having a plurality of semiconductor fuses programmed with fuse values, wherein the hash circuit is operable to receive fuse values from the fuse array and generate one or more hashes by applying the Simon cipher to the fuse values.

Example 3 is the processor of example 2 that optionally includes that the circuitry is operable to generate the hash digest by combining an input to an immediately preceding application of the Simon cipher to one of the plurality of values and an output resulting from the immediately preceding application of the Simon cipher.

Example 4 is the processor of example 3 that optionally includes a controller coupled to the hash circuit and the fuse array to cause the hash circuit to receive the fuse values in the fuse array one at a time and apply the Simon cipher to each of the fuse values separately, until the Simon cipher has been applied to all of the fuse values from the fuse array, wherein the circuitry is operable to combine each output of the Simon cipher when generated with a total that is based on previous outputs of the Simon cipher.

Example 5 is the processor of example 2 that optionally includes that the circuitry implements an XOR gate having: a first XOR gate input coupled to a round logic output of the Simon cipher; a second XOR gate input coupled to an immediately preceding round logic input of the Simon cipher; and an XOR gate output coupled to the round logic input of the Simon cipher.

Example 6 is the processor of example 2 that optionally includes a fuse microcontroller coupled to the fuse array to provide the fuse values to the hash circuit, wherein the hash circuit comprises a local controller coupled to the fuse microcontroller to request the fuse microcontroller to send the next fuse value from the fuse array only after an immediately preceding hash value provided by the fuse microcontroller has been loaded into the hash circuit.

Example 7 is the processor of example 1 that optionally includes that the Simon cipher comprises a bit slice datapath for key generation and round logic.

Example 8 is the processor of example 1 that optionally includes that the hash circuit is bit-serial and includes a Simon cipher that operates in bit-serial fashion.

Example 9 is the processor of example 1 that optionally includes a microcontroller coupled to the hash circuit via: a first signal interface to indicate to the hash circuit that new data is available for hashing by the hash circuit; a second signal interface for use by the hash circuit to indicate to the microcontroller that the hash circuit has finished applying to Simon cipher with the new data; and a third signal interface to indicate that a hash used in the hash circuit is to be reinitialized when a new data block is started.

Example 10 is the processor of example 9 that optionally includes a local controller to coordinate loading of data into the Simon cipher, wherein the local controller is operable to successively load and internally shift partial data within key storage of the Simon cipher if data loading size is less than key size.

Example 11 is the processor of example 10 that optionally includes that the local controller uses a linear feedback shift register inside the Simon cipher to track operations in the Simon cipher to determine when to request more input data.

Example 12 is the processor of example 9 that optionally includes that the hash circuit is operable to receive input data having a prefix prepended to each programmed value and an addend which is padded to make the input data a multiple of the Simon cipher key size used in the hashing circuit.

Example 13 is a method for fuse value validation that comprises receiving fuse values from a fuse array having a plurality of semiconductor fuses programmed with fuse values, generating one or more hash values by applying a Simon cipher using a hash circuit that receives the fuse values as keys, and generating a value indicative of whether the fuse values in the fuse array are valid based on outputs generated by applying the Simon cipher to each of the fuse values separately, including combining outputs generated by applying the Simon cipher to each of the fuse values into a digest.

Example 14 is the method of example 13 that optionally includes that generating one or more hash values by applying a Simon cipher to the fuse values using a hash circuit comprises applying the Simon cipher to a first key input that includes one fuse value and a second plaintext input, the second plaintext input being generated by combining an input to an immediately preceding application of the Simon cipher with an output resulting from the immediately preceding application of the Simon cipher.

Example 15 is the method of example 13 that optionally includes generating one or more control signals to obtain fuse values from the fuse array to be sent to the hash circuit one at a time and applying the Simon cipher to each of the fuse values with the second plaintext input until the Simon cipher has been applied to all of the fuse values from the fuse array.

Example 16 is a system that comprises an interconnect, a dynamic random access memory (DRAM) coupled to the interconnect, and a processor coupled to the interconnect, where the processor includes a fuse array the fuse array comprising a plurality of semiconductor fuses with fuse values and a hash circuit coupled to the fuse array comprising Simon cipher circuit operable to receive fuse values from the fuse array and to generate one or more hashes by applying a Simon cipher to each of the fuse values, and circuitry coupled to the Simon cipher circuit to combine outputs from the Simon cipher circuit for each value of the plurality of values into a hash digest that is indicative of whether the fuse values in the fuse array are valid.

Example 17 is the system of example 16 that optionally includes that the circuitry is operable to generate the hash digest by combining an input to an immediately preceding application of the Simon cipher to one of the plurality of values and an output resulting from the immediately preceding application of the Simon cipher.

Example 18 is the system of example 17 that optionally includes a controller coupled to the hash circuit and the fuse array to cause the hash circuit to receive the fuse values in the fuse array one at a time and apply the Simon cipher to each of the fuse values separately, until the Simon cipher has been applied to all of the fuse values from the fuse array, the circuitry to combine each output of the Simon cipher when generated with a total that is based on previous outputs of the Simon cipher.

Example 19 is a machine-readable medium having stored thereon an instruction, which if performed by a machine causes the machine to perform a method for fuse value validation, where the method comprises receiving fuse values from a fuse array having a plurality of semiconductor fuses programmed with fuse values, generating one or more hash values by applying a Simon cipher using a hash circuit that receives the fuse values as keys, and generating a value indicative of whether the fuse values in the fuse array are valid based on outputs generated by applying the Simon cipher to each of the fuse values separately, including combining outputs generated by applying the Simon cipher to each of the fuse values into a digest.

Example 20 is the machine-readable medium of example 19 that optionally includes that the method further comprises generating one or more hash values by applying a Simon cipher to the fuse values using a hash circuit comprises applying the Simon cipher to a first key input that includes one fuse value and a second plaintext input, the second plaintext input being generated by combining an input to an immediately preceding application of the Simon cipher with an output resulting from the immediately preceding application of the Simon cipher.

Example 21 is a processor or other apparatus operative to perform the method of any one of examples 13 to 15.

Example 22 is a processor or other apparatus that includes means for performing the method of any one of examples 13 to 15.

Example 23 is a processor or other apparatus substantially as described herein.

Example 24 is a processor or other apparatus that is operative to perform any method substantially as described herein.

Example 25 is a processor or other apparatus that is operative to perform any instructions/operations substantially as described herein.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   a memory to store a plurality of values; and
   a hash circuit comprising:
   a Simon cipher circuit operable to apply a Simon cipher to each of the plurality of values and to generate, from and back into a digest register, an output for each of the plurality of values,
   circuitry coupled to the Simon cipher circuit to combine outputs from the Simon cipher circuit for each value of the plurality of values at each of a plurality of rounds or cycles into the digest register to produce a hash digest that is indicative of whether the values in the memory are valid,
   wherein the memory comprises a fuse array having a plurality of semiconductor fuses programmed with fuse values, wherein the hash circuit is operable to receive fuse values from the fuse array and generate one or more hashes by applying the Simon cipher to the fuse values.

2. The processor defined in claim 1 wherein the circuitry is operable to generate the hash digest by combining an input to an immediately preceding application of the Simon cipher to one of the plurality of values and an output resulting from the immediately preceding application of the Simon cipher.

3. The processor defined in claim 2 further comprising a controller coupled to the hash circuit and the fuse array to cause the hash circuit to receive the fuse values in the fuse array one at a time and apply the Simon cipher to each of the fuse values separately, until the Simon cipher has been applied to all of the fuse values from the fuse array, the circuitry to combine each output of the Simon cipher when generated with an accumulation from the digest register that is based on previous outputs of the Simon cipher.

4. The processor defined in claim 1 wherein the circuitry implements an XOR gate having: a first XOR gate input coupled to a round logic output of the Simon cipher; a second XOR gate input coupled to an immediately preceding round logic input of the Simon cipher; and an XOR gate output coupled to the round logic input of the Simon cipher.

5. The processor defined in claim 1 further comprising: a fuse microcontroller coupled to the fuse array to provide the fuse values to the hash circuit; wherein the hash circuit comprises a local controller coupled to the fuse microcontroller to request the fuse microcontroller to send the next fuse value from the fuse array only after an immediately preceding hash value provided by the fuse microcontroller has been loaded into the hash circuit.

6. The processor defined in claim 1 wherein the Simon cipher comprises a bit slice datapath for key generation and round logic.

7. The processor defined in claim 1 wherein the hash circuit is bit-serial and includes the Simon cipher circuit, which operates in bit-serial fashion.

8. The processor defined in claim 1 further comprising a microcontroller coupled to the hash circuit via:
a first signal interface to indicate to the hash circuit that new data is available for hashing by the hash circuit;
a second signal interface for use by the hash circuit to indicate to the microcontroller that the hash circuit has finished applying to Simon cipher with the new data; and
a third signal interface to indicate that a hash used in the hash circuit is to be reinitialized when a new data block is started.

9. The processor defined in claim 8 further comprising a local controller to coordinate loading of data into the Simon cipher, wherein the local controller is operable to successively load and internally shift partial data within key storage of the Simon cipher if data loading size is less than key size.

10. The processor defined in claim 9 wherein the local controller uses a linear feedback shift register inside the Simon cipher to track operations in the Simon cipher to determine when to request more input data.

11. The processor defined in claim 8 wherein the hash circuit is operable to receive input data having a prefix prepended to each programmed value and an addend which is padded to make the input data a multiple of the Simon cipher key size used in the hashing circuit.

12. A method for fuse value validation, the method comprising:
receiving fuse values from a fuse array having a plurality of semiconductor fuses programmed with fuse values;
generating one or more hash values by applying a Simon cipher using a hash circuit that receives the fuse values as keys; and
generating a value indicative of whether the fuse values in the fuse array are valid based on outputs generated by applying the Simon cipher to each of the fuse values separately, including combining outputs generated by applying the Simon cipher to each of the fuse values into a digest register, wherein the combining comprises combining output of the digest register and output of a Simon cipher circuit through an accumulation circuit and back into the digest register.

13. The method defined in claim 12 wherein generating one or more hash values by applying a Simon cipher to the fuse values using a hash circuit comprises applying the Simon cipher to a first key input that includes one fuse value and a second plaintext input, the second plaintext input being generated by combining an input to an immediately preceding application of the Simon cipher with an output resulting from the immediately preceding application of the Simon cipher.

14. The method defined in claim 12 further comprising generating one or more control signals to obtain fuse values from the fuse array to be sent to the hash circuit one at a time and applying the Simon cipher to each of the fuse values with the second plaintext input until the Simon cipher has been applied to all of the fuse values from the fuse array.

15. A system comprising:
an interconnect;
a dynamic random access memory (DRAM) coupled to the interconnect; and
a processor coupled to the interconnect, including
a fuse array the fuse array comprising a plurality of semiconductor fuses with fuse values,
a hash circuit coupled to the fuse array comprising
a Simon cipher circuit operable to receive fuse values from the fuse array and to generate, from and back into a digest register, one or more hashes by applying a Simon cipher to each of the fuse values; and
circuitry coupled to the Simon cipher circuit to combine outputs from the Simon cipher circuit for each value of the plurality of values at each of a plurality of rounds or cycles into the digest register to produce a hash digest that is indicative of whether the fuse values in the fuse array are valid.

16. The system defined in claim 15 wherein the circuitry is operable to generate the hash digest by combining an input to an immediately preceding application of the Simon cipher to one of the plurality of values and an output resulting from the immediately preceding application of the Simon cipher.

17. The system defined in claim 16 further comprising a controller coupled to the hash circuit and the fuse array to cause the hash circuit to receive the fuse values in the fuse array one at a time and apply the Simon cipher to each of the fuse values separately, until the Simon cipher has been applied to all of the fuse values from the fuse array, the circuitry to combine each output of the Simon cipher when generated with an accumulation from the digest register that is based on previous outputs of the Simon cipher.

18. A tangible, non-transitory, machine-readable medium having stored thereon an instruction, which if performed by a machine causes the machine to perform a method for fuse value validation, the method comprising:
receiving fuse values from a fuse array having a plurality of semiconductor fuses programmed with fuse values;
generating one or more hash values by applying a Simon cipher using a hash circuit that receives the fuse values as keys; and
generating a value indicative of whether the fuse values in the fuse array are valid based on outputs generated by applying the Simon cipher to each of the fuse values separately, including combining outputs generated by applying the Simon cipher to each of the fuse values into a digest register, wherein the combining comprises combining output of the digest register and output of a Simon cipher circuit through an accumulation circuit and back into the digest register.

19. The machine-readable medium defined in claim 18 wherein the method further comprises generating one or more hash values by applying a Simon cipher to the fuse values using a hash circuit comprises applying the Simon cipher to a first key input that includes one fuse value and a second plaintext input, the second plaintext input being generated by combining an input to an immediately preceding application of the Simon cipher with an output resulting from the immediately preceding application of the Simon cipher.

* * * * *